(12) United States Patent
Alameh et al.

(10) Patent No.: US 11,044,611 B2
(45) Date of Patent: Jun. 22, 2021

(54) AUTHENTICATION FOR DEVICE ACCESS

(71) Applicant: Motorola Mobility LLC, Chicago, IL (US)

(72) Inventors: Rachid M. Alameh, Crystal Lake, IL (US); Eric Le Roy Krenz, Crystal Lake, IL (US); John J. Gorsica, IV, Round Lake, IL (US); Jarrett K. Simerson, Glenview, IL (US)

(73) Assignee: Motorola Mobility LLC, Chicago, IL (US)

( * ) Notice: Subject to any disclaimer, the term of this patent is extended or adjusted under 35 U.S.C. 154(b) by 49 days.

(21) Appl. No.: 16/450,203

(22) Filed: Jun. 24, 2019

(65) Prior Publication Data
US 2020/0404489 A1 Dec. 24, 2020

(51) Int. Cl.
*H04W 12/00* (2021.01)
*H04W 12/06* (2021.01)
*H04W 12/63* (2021.01)

(52) U.S. Cl.
CPC ........... *H04W 12/63* (2021.01); *H04W 12/06* (2013.01)

(58) Field of Classification Search
CPC ........................ H04W 12/00503; H04W 12/06
See application file for complete search history.

(56) References Cited

U.S. PATENT DOCUMENTS

| | | | |
|---|---|---|---|
| 9,641,954 B1* | 5/2017 | Typrin | H04W 4/16 |
| 9,701,281 B2* | 7/2017 | Reiser | H04W 4/80 |
| 10,037,286 B2* | 7/2018 | Vecera | H04L 9/3213 |
| 2016/0313957 A1* | 10/2016 | Ebert | H04W 4/02 |
| 2017/0006009 A1* | 1/2017 | Hessler | G06F 21/316 |
| 2017/0041296 A1* | 2/2017 | Ford | G06F 16/951 |
| 2017/0124562 A1* | 5/2017 | Hessler | G06Q 20/0855 |
| 2017/0302659 A1* | 10/2017 | Shteingart | H04L 63/0853 |
| 2018/0139054 A1* | 5/2018 | Chu | H04L 9/3247 |
| 2018/0276367 A1* | 9/2018 | Benson | G06F 21/34 |
| 2019/0058700 A1* | 2/2019 | Kurian | H04W 12/63 |
| 2019/0357365 A1* | 11/2019 | Tyagi | G06F 1/1652 |
| 2020/0404489 A1* | 12/2020 | Alameh | H04W 12/33 |

OTHER PUBLICATIONS

Tahir, "On the security of consumer wearable devices in the Internet of Things", Retrieved at: https://journals.plos.org/plosone/article?id=10.1371/journal.pone.0195487, Apr. 18, 2018, 13 pages.

* cited by examiner

*Primary Examiner* — Yonas A Bayou
(74) *Attorney, Agent, or Firm* — FIG. 1 Patents

(57) ABSTRACT

Techniques for authentication for device access are described. In the described techniques, interaction between a client device and an assistant device is utilized to authenticate the client device for access to protected functionality and/or content. For instance, proximity between the client device and the assistant device, and physical authentication of a user with the assistant device, are leveraged for authenticating the client device for access to the protected functionality and/or content.

20 Claims, 16 Drawing Sheets

AUTHENTICATION FOR DEVICE ACCESS

BACKGROUND

Data security is of utmost importance in today's connected society. To assist in securing users' data, most computing devices utilize some type of authentication process that requires a user to authenticate with a device before accessing functionality and/or content of the device. Further, most typical authentication processes employ authentication factors that a user provides in various ways as part of the authentication process to confirm the user's identity. Various types and combinations of authentication factors are available, such as passwords, personal identification numbers (PINS), biometric authentication, and so forth. Current authentication processes, however, are often easily spoofed by malicious entities to allow such entities to gain unauthorized access to protected data and other assets on a device.

BRIEF DESCRIPTION OF THE DRAWINGS

Aspects of authentication for device access are described with reference to the following Figures. The same numbers may be used throughout to reference similar features and components that are shown in the Figures.

DETAILED DESCRIPTION

Figure 1:
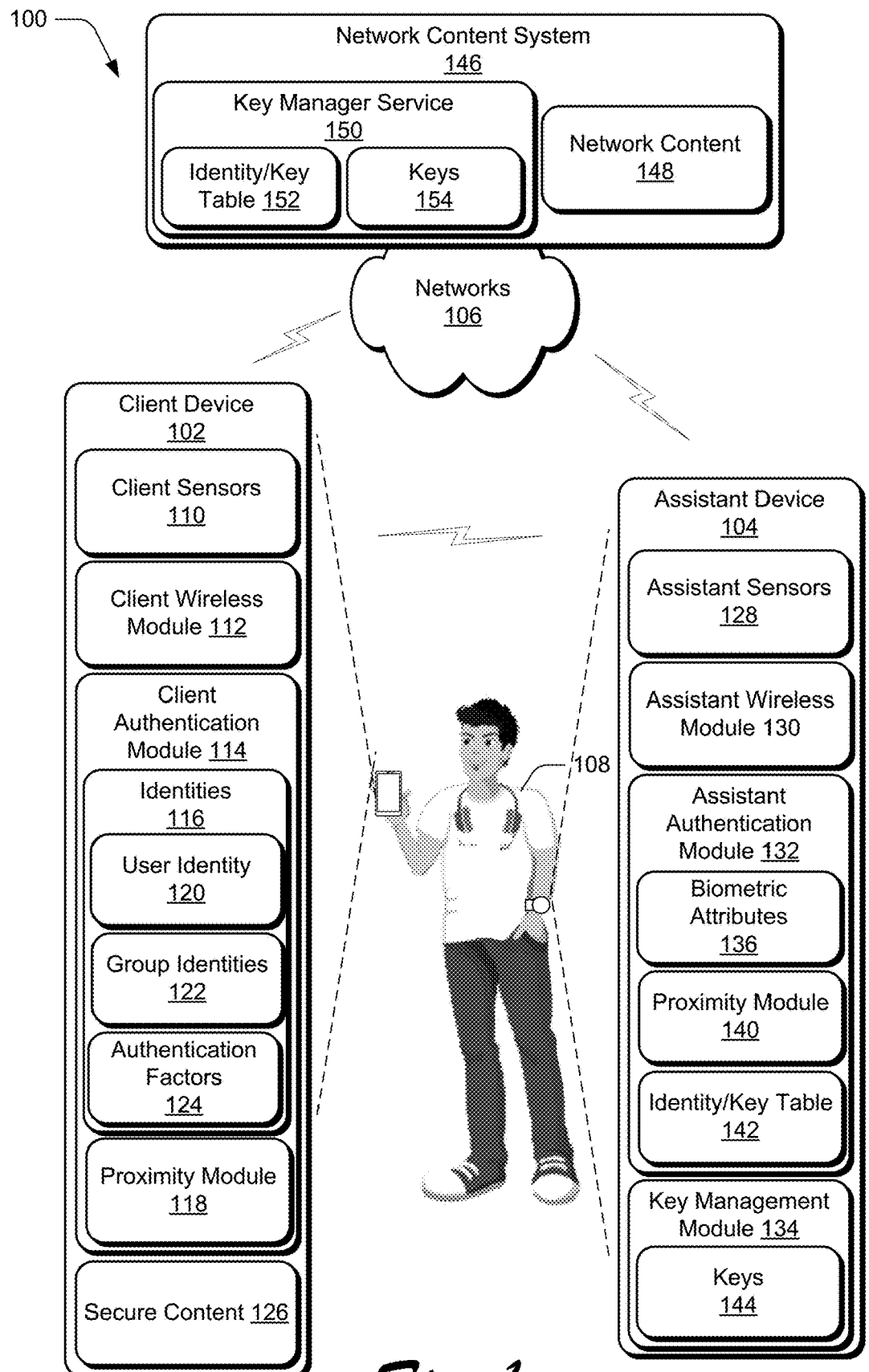
FIG. 1 illustrates an example environment in which aspects of authentication for device access can be implemented.

Techniques for authentication for device access are described, and may be implemented to enable a client device to securely access functionality of the client device and/or secure content via the client device. Generally, the described implementations leverage multiple authentication conditions to provide more secure authentication than is provided by traditional authentication techniques.

According to various implementations, the described techniques use a combination of device proximity and physical authentication to determine whether a user is authenticated for access to functionality and/or secure content via a client device. Generally, "device proximity" refers to a physical distance between two devices, such as a client device that is requesting access, and a different device that is leveraged to assist in determining whether to allow the access request. Further, "physical authentication" refers to utilizing a physical relationship between a user of the client device and the different device, such as whether the user is in physical contact with and/or physical possession of the different device.

In an example scenario, consider that a user is in possession of a mobile phone and is also wearing a smart watch. Further, the user requests access to functionality and/or content on the mobile phone that is access protected. To enable the user to access the protected functionality/content, an access authentication process is implemented via interaction between the mobile phone and the smart watch. In at least one implementation, the access authentication process includes a local authentication at the mobile phone, a proximity determination between the mobile phone and the smart watch, and a physical authentication of the user at the smart watch.

For instance, as part of the access authentication, the user performs a local authentication at the mobile phone, such as by entering an authentication factor on the mobile phone. In conjunction with a successful local authentication at the mobile phone, a proximity process is implemented that determines whether the smart watch is within a threshold proximity to the mobile phone. The threshold proximity, for example, represents a predefined distance value, such as in meters and/or any other suitable distance unit. Generally, the proximity process seeks to ensure that the smart watch is close enough to the mobile phone such that the mobile phone is permitted to be access authenticated. For instance, if the smart watch is outside of the threshold proximity to the mobile phone, the access authentication will typically fail.

In conjunction with the local authentication and the proximity process, the access authentication involves determining whether the user is physically authenticated with the smart watch. The physical authentication, for example, determines whether the user is in physical contact with the smart watch, and/or whether the user is in physical possession of the smart watch. For instance, if the user is detected as being in physical contact with and/or physical possession of the smart watch, the physical authentication is successful.

Further to this example scenario, consider that the local authentication, the proximity authentication, and the physical authentication are successful. Accordingly, the user is access authenticated to the mobile phone. Generally, this enables the user to access certain access protected functionality and/or content via the mobile phone. For instance, the mobile phone may be in a locked state such that the successful access authentication unlocks the mobile phone. In a further implementation, certain applications and/or system processes of the mobile phone may be access protected such that a successful access authentication allows access to the applications/processes.

In yet another implementation, digital content available via the mobile phone may be access protected, such as in the form of encrypted content. For instance, the digital content may be encrypted with a key that is associated with an individual and/or group identity such that users authenticated with the identity are permitted access to the key for decrypting the content. Accordingly, in this particular example scenario, successful access authentication enables the mobile phone to access a decryption key to decrypt the encrypted content and access the digital content in the clear. The smart watch, for example, maintains decryption keys that are usable to decrypt instances of encrypted digital content. Accordingly, based on a successful access authentication of the mobile phone, the smart watch can communicate a decryption key to the mobile phone that is usable to decrypt the encrypted content. In at least one implementation, the decryption key is associated with a particular individual and/or group identity such that a successful access authentication using the identity allows access to the decryption key.

Accordingly, the techniques described herein provide more robust and secure ways for securing access to functionality and content than is provided by traditional authentication techniques. For instance, at least some implementations utilize 3-factor authentication (e.g., local authentication, proximity authentication, and physical authentication) that is considerably more difficult to spoof by unauthorized entities than are traditional authentication techniques.

While features and concepts of authentication for device access can be implemented in any number of environments and/or configurations, aspects of authentication for device access are described in the context of the following example systems, devices, and methods.

FIG. 1 illustrates an example environment 100 in which aspects of authentication for device access can be implemented. The environment 100 includes a client computing device ("client device") 102, an assistant device 104, and networks 106. In this particular example, the client device 102 represents a portable device that can be carried by a user 108, such as a smartphone, a tablet device, a laptop, and so forth. Further, the assistant device 104 represents a wearable computing device, such as a smartwatch, a fitness tracker, a smart textile, and so forth. These examples are not to be construed as limiting, however, and the client device 102 and/or the assistant device 104 can be implemented in a variety of different ways and form factors. Generally, the assistant device 104 is referred to as an "assistant" due to its ability to assist in an authentication process of the client device 102. This is not to be construed as limiting, however, and the assistant device 104 may represent a standalone computing device that is capable of providing a variety of different functionalities and user experiences independently from the client device 102. Example attributes of the client device 102 and the assistant device 104 are discussed below with reference to the device 1900 of FIG. 19.

The client device 102 includes various functionality that enables the client device 102 to perform different aspects of authentication for device access discussed herein, including client device sensors ("client sensors") 110, a client wireless module 112, and a client authentication module 114. The client sensors 110 are representative of functionality to detect various physical and/or logical phenomena in relation to the client device 102, such as motion, light, image detection and recognition, time and date, position, location, touch detection, sound, temperature, and so forth. Accordingly, examples of the client sensors 110 include hardware and/or logical sensors such as an accelerometer, a gyroscope, a camera, a microphone, a clock, biometric sensors, touch input sensors, position sensors, environmental sensors (e.g., for temperature, pressure, humidity, and so on), and so forth.

The client wireless module 112 represents functionality (e.g., hardware and logic) that enables the client device 102 to communicate wirelessly, such as for wireless data and voice communication. The client wireless module 112, for instance, includes functionality to support different wireless protocols, such as wireless cellular (e.g., 3G, 4G, 5G), wireless broadband, Wireless Local Area Network (WLAN) (e.g., Wi-Fi), Wi-Fi Direct, wireless short distance communication (e.g., Bluetooth™ (including Bluetooth™ Low Energy (BLE)), Near Field Communication (NFC)), and so forth. The client wireless module 112, for instance, enables wireless data communication between the client device 102 and the assistant device 104 over the networks 112, and/or direct wireless data communication between the client device 102 and the assistant device 104.

Further to the client device 102, the client authentication module 114 represents functionality to perform various aspects of techniques for authentication for device access described herein. For instance, the client authentication module 114 enables the user 108 to authenticate with the client device 102 for access to functionality and/or content of the client device 102. Accordingly, the client authentication module 114 includes and/or has access to identities 116 and a proximity module 118. Generally, the identities 116 are data representations of entities that have certain permissions, such for access to functionality and content of the client device 102. The identities 116 include a user identity 120 and group identities 122. The user identity 120 represents an identity for a single entity, such as the user 108. The group identities 122 include identities that can be used to define groups of entities, such as groups of users that can be associated with certain permissions. In at least some implementations, the identities 116 can be associated with different respective authentication factors 124 that are usable to authenticate an entity as corresponding to a respective identity 116.

The proximity module 118 represents functionality for detecting proximity of the client device 102 to other entities, such as the assistant device 104 and the user 108. For instance, the proximity module 118 can utilize sensor data from the client sensors 110 to approximate a physical distance between the client device 102 and the assistant device 104. As detailed throughout, this physical distance can be leveraged for purposes of authenticating an entity for access to functionality and/or content associated with the client device 102.

The client device 102 further includes secure content 126, which represents content that is maintained by the client device 102 in a secure manner such that some form of authorization process is utilized to allow access to the secure content 126. For example, the secure content 126 may be stored in an encrypted form such that a decryption key is required to decrypt and view the secure content "in the clear."

Further to the environment 100, the assistant device 104 also includes various functionality that enables the assistant device 104 to participate in performing different aspects of authentication for device access discussed herein, including assistant device sensors ("assistant sensors") 128, an assistant wireless module 130, an assistant authentication module 132, and a key management module 134. The assistant sensors 128 are representative of functionality to detect various physical and/or logical phenomena in relation to the assistant device 104, such as motion, light, image detection and recognition, time and date, position, location, touch detection, sound, temperature, and so forth. Examples of the assistant sensors 128 include hardware and/or logical sensors such as an accelerometer, a gyroscope, a camera, a microphone, a clock, biometric sensors, touch input sensors, position sensors, environmental sensors (e.g., for temperature, pressure, humidity, and so on), and so forth.

The assistant wireless module 130 represents functionality (e.g., hardware and logic) that enables the assistant device 104 to communicate wirelessly, such as for wireless data and voice communication. The assistant wireless module 130, for instance, includes functionality to support different wireless protocols, such as wireless cellular (e.g., 3G, 4G, 5G), wireless broadband, Wireless Local Area Network (WLAN) (e.g., Wi-Fi), Wi-Fi Direct, wireless short distance communication (e.g., Bluetooth™ (including Bluetooth™ Low Energy (BLE)), Near Field Communication (NFC)), and so forth.

Further to the assistant device 104, the assistant authentication module 132 represents functionality to perform various aspects of techniques for authentication for device access described herein. The assistant authentication module 132, for instance, can authenticate an identity of the user 108, such as part of an authentication process of the client device 102. Accordingly, the assistant authentication module 132 includes biometric attributes 136, a proximity module 140, and an identity/key table 142. The biometric attributes 136 represent data that describes various biometric traits of a user (e.g., the user 108), such as fingerprints, vein patterns, face recognition, DNA, palm print, hand geometry, eye recognition, behavioral characteristics (e.g., gait, voice, gesture patterns), and so forth. The biometric attributes 136, for instance, can be leveraged to physically authenticate the user 108 to the assistant device 104.

The proximity module 140 represents functionality for detecting proximity of the assistant device 104 to other entities, such as the client device 102. For instance, the proximity module 140 can utilize sensor data from the assistant sensors 128 to approximate a physical distance between the assistant device 104 and the client device 102. As detailed throughout, this physical distance can be leveraged for purposes of authenticating an entity for access to functionality and/or content associated with the client device 102.

The identity/key table 142 maintains and/or has access to data that tracks correlations between different identities and keys (e.g., encryption and decryption keys) to which respective entities are permitted access. For instance, the key management module 134 manages a group of keys 144, and the identity/key table 142 specifies which identities 116 are permitted access to particular instances of the keys 144. The key management module 134, for example, can provide instances of the keys 144 in response to queries from the assistant authentication module 132 for particular instances of the keys 144.

The environment 100 further includes a network content system 146 with network content 148 and a key manager service 150. The network content system 146 generally represents a network-based (e.g., cloud-based) system that can be leveraged to perform various aspects of authentication for device access. For instance, the network content system 146 can manage access to the network content 148, such as for enabling the network content 148 to be accessible to the client device 102 in a secure manner. The network content 148 is representative of various types of digital content that can be consumed by the client device 102 and/or other entities, such as images, audio, video, virtual reality and/or augmented reality experiences, and so forth. At least some of the network content 148 is maintained in a secure form, such as encrypted.

The key manager service 150 represents functionality that can manage various key-related services for the network content system 146, and includes an identity/key table 152 and keys 154. The key manager service 150, for instance, can perform actions such as encryption and decryption of the network content 148, as well as provisioning of instances of the keys 154 to various entities, such as the client device 102 and/or the assistant device 104. In at least one implementation, the identity/key table 152 and the keys 154 include at least some common data with the identity/key table 142 and the keys 144, respectively, of the assistant device 104.

Generally, communication between the client device 102, the assistant device 104, and the network content system 146 can be enabled via connectivity (e.g., wireless and/or wired connectivity) to the networks 106. The networks 106, for instance, represents wireless and/or wired networks, and/or combinations thereof. Further, the client device 102 and the assistant device 104 can communicate data with one another via direct device-to-device wireless data communication.

Having discussed an example environment in which the disclosed techniques can be performed, consider now some example scenarios and implementation details for implementing the disclosed techniques.

Figure 2:
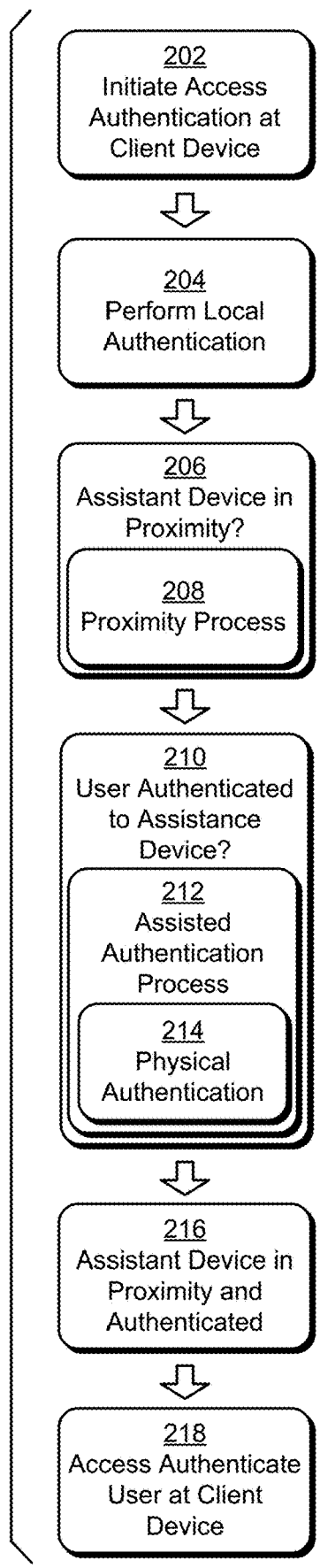
FIG. 2 depicts a system with details for implementing techniques described herein in accordance with one or more implementations.
Figure 2:
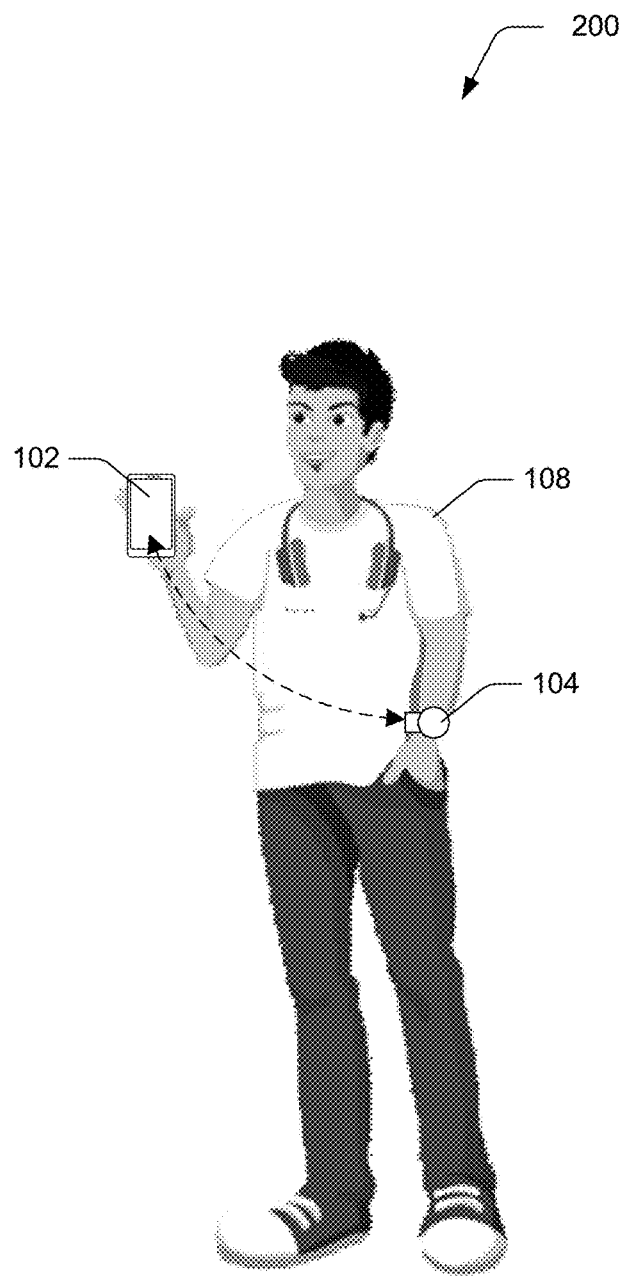

FIG. 2 depicts an example system 200 for implementing authentication for device access in accordance with one or more implementations. Generally, the system 200 can be implemented in the environment 100, and incorporates attributes of the environment 100 introduced above.

In the system 200, at 202 the user 108 initiates access authentication at the client device 102. The access authentication can be for various purposes, such as to unlock the client device 102 from a locked state, to allow access to a particular functionality of the client device 102 (e.g., an application or system service), and/or to enable access to content via the client device 102, e.g., the secure content 126 and/or the network content 148. Generally, the access authentication process can be implemented in several parts, including a local authentication with the client device 102, and a remote authentication involving the assistant device 104.

Accordingly, based on initiating the authentication, at 204 a local authentication is performed at the client device 102. The user 108, for instance, inputs an authentication factor 124 to the client device 102, such as a username, a password, and/or a biometric input. Based on a successful local authentication at the client device 102, at 206 a determination is made whether an assistant device is in proximity to the client device. For instance, a proximity process 208 is performed that seeks determine whether an assistant device that is functionally capable of assisting the client device 102 in authentication is within a threshold proximity to the client device 102.

Generally, the proximity process 208 can be implemented in a number of different ways, detailed examples of which are discussed below. In this particular scenario, the proximity process 208 indicates that the assistant device 104 is located within a threshold proximity to the client device 102. Accordingly, at 210 it is determined, via an assisted authentication process 212, whether the assistant device 104 is authenticated to the user 108. Generally, the assisted authentication process 212 can be implemented in various ways, such as by the client authentication module 114 pulling an authentication status of the user 108/assistant device 104 from the assistant device 104. Alternatively or additionally, the assistant device 104 can leverage the assistant authentication module 132 to push an authentication status of the user 108/assistant device 104 to the client device 102.

In at least one implementation, the assisted authentication process 212 includes a physical authentication 214 of the user 108 with the assistant device 104. Generally, the physical authentication 214 involves determining a physical status of the user 108 relative to the assistant device 104. The physical authentication 214, for example, determines whether the assistant device 104 is detected in physical contact with the user 108, such as occurs when the assistant device 104 is worn on the body of the user 108. Such physical contact may be determined in various ways, such as by determining skin contact between the user 108 and the assistant device 104, e.g., as detected via a capacitive sensor of the assistant sensors 128.

Additionally or alternatively to physical contact detection, the physical authentication 214 can include ways of detecting physical possession by the user 108. For instance, the biometric attributes 136 can be compared to sensor data obtained from the assistant sensors 128 to determine whether the assistant device 104 is in physical possession of the user 108. Examples of such sensor data include gait data, facial recognition data, voice recognition data, temperature data, and/or other ways of recognizing physical attributes of the user 108. In at least some implementations, even if the user 108 is not detected as being in physical contact with the assistant device 104 (e.g., skin contact), detecting that the user 108 is in physical possession of the assistant device 104 is sufficient to show physical authentication.

Further to the system 200, at 216 it is determined based on the proximity process 208 and the assisted authentication process 212 that the assistant device 104 is within a threshold proximity to the client device 102 and that the assistant device 104 is authenticated to the user 108. Accordingly, at 218 the client device 102 is access authenticated to the user 108 to enable the user 108 to access functionality and/or content of the client device 102. Thus, in at least some implementations, an authentication of the user 108 at the client device 102 involves both a local authentication process at the client device 102, and a remote authentication process involving the assistant device 104.

Figure 3:
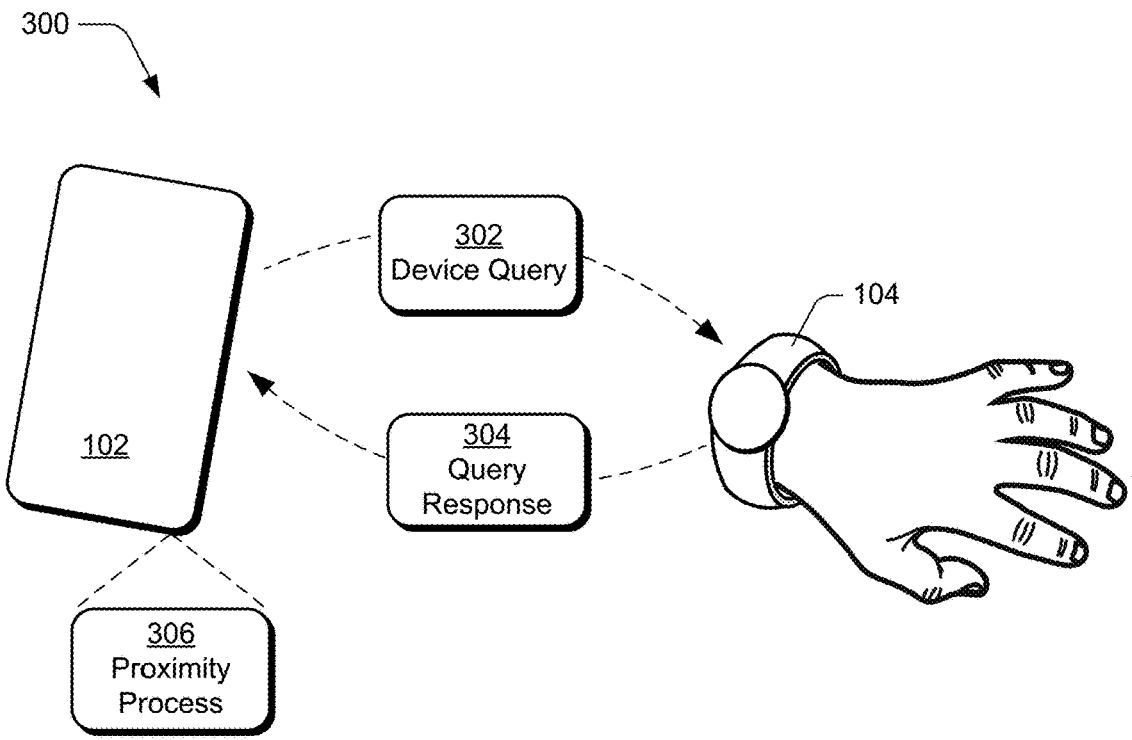
FIG. 3 depicts a system for determining device proximity in accordance with one or more implementations.
Figure 4:
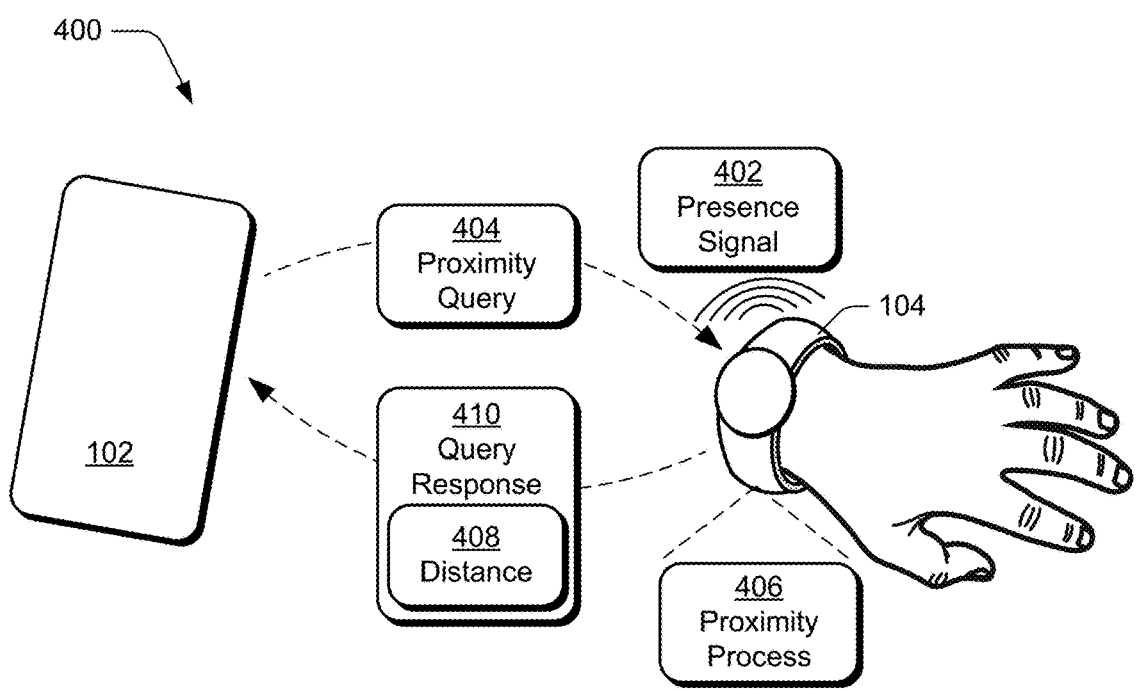
FIG. 4 depicts a system for determining device proximity in accordance with one or more implementations described herein.

FIGS. 3 and 4 depict systems for implementing example ways in which device proximity can be determined, such as part of the proximity process 208 discussed above. For instance, FIG. 3 depicts a system 300 in which proximity of the assistant device 104 to the client device 102 is determined by the client device 102. In the scenario 300, the client device 102 transmits a device query 302 that represents a general query for an available assistant device that is functionally capable of assisting the client device 102 in authentication. The assistant device 104 receives the device query 302, and transmits a query response 304 that identifies that assistant device 104, and that indicates that the assistant device 104 is physically authenticated to the user 108. The query response 304, for instance, includes a specific identifier that is recognized by the client device 102 as corresponding to a device that is capable of verifying physical authentication with a user. As discussed throughout, physical authentication can be determined in various ways, such as via detection of contact between the assistant device 104 and skin of the user 108, and/or via detection that the user 108 is in possession of the assistant device 104.

Further to the system 300, the client device 102 receives the query response 304 and performs a proximity process 306 to determine a physical distance between the client device 102 and the assistant device 104. Generally, the proximity process 306 can be implemented in various ways. For instance, the proximity module 118 can leverage sensor data captured by the client sensors 110, and/or wireless data captured by the client wireless module 112 to determine distance between the client device 102 and the assistant device 104. One example distance technique utilizes a time of flight procedure to detect a distance between the client device 102 and the assistant device 104. In another example, the client device 102 and the assistant device 104 can exchange wireless signals, and the proximity module 118 can determine distance between the devices based on attributes of the wireless signals, such as round trip time. Other examples of the proximity process 306 include ultrasonic, thermal, and image-based techniques, e.g., using a camera of the client device 102 to capture an image of a physical environment surrounding the client device 102, and identifying the assistant device 104 in the captured image. Accordingly, based on proximity process 306, the client device 102 determines that the assistant device 104 is within a threshold proximity to the client device 102. Since the assistant device 104 is physically authenticated to the user 108 and is within the threshold proximity, the client device 102 is authenticated for access to functionality and/or content that is accessible via the client device 102.

FIG. 4 depicts a system 400 in which proximity of the assistant device 104 to the client device 102 is determined by the assistant device 104. In the system 400, the assistant device 104 transmits a presence signal 402 that identifies the assistant device 104 and that indicates that the user 108 is physically authenticated to the user 108. In at least one implementation, the assistant device 104 transmits the presence signal 402 periodically, such as in the form of a periodic presence beacon. Further, the presence signal 402 may be transmitted independently of any knowledge by the assistant device 104 of the presence of any other device, e.g., the client device 102.

Accordingly, the client device 102 detects the presence signal 402 and transmits a proximity query 404 to the assistant device 104. Generally, the proximity query 404 requests distance data from the assistant device 104. Thus, the assistant device 104 receives the proximity query 404, and performs a proximity process 406 that determines a distance between the assistant device 104 and the client device 102. The assistant device 104, for instance, leverages sensor data captured by the assistant sensors 128, and/or wireless data captured by the assistant wireless module 132, to determine physical distance between the devices. Example techniques for determining physical distance between the devices are discussed above.

Based on the proximity process 406, the assistant device 104 determines a physical distance 408 between the assistant device 104 and the client device 102, and returns a query response 410 to the client device 102 that identifies the physical distance 408. Thus, the client authentication module 114 can compare the physical distance 408 to a predefined threshold distance and if the physical distance 408 is within (e.g., not greater than) the threshold distance, and the assistant device 104 is indicated as being physically authenticated to the user 108 (e.g., as indicated by the presence signal 402), the client authentication module 114 can cause the client device 102 to transition to an authenticated state to allow the user 108 to access functionality and/or content of the client device 102.

The systems 300, 400 are presented as examples, and it is to be appreciated that other ways for determining distance between devices may be employed within the scope of the claimed implementations. For instance, the various inter-device communications presented in the systems 300, 400 may be combined in different ways to provide for a variety of different possible scenarios.

Figure 5:
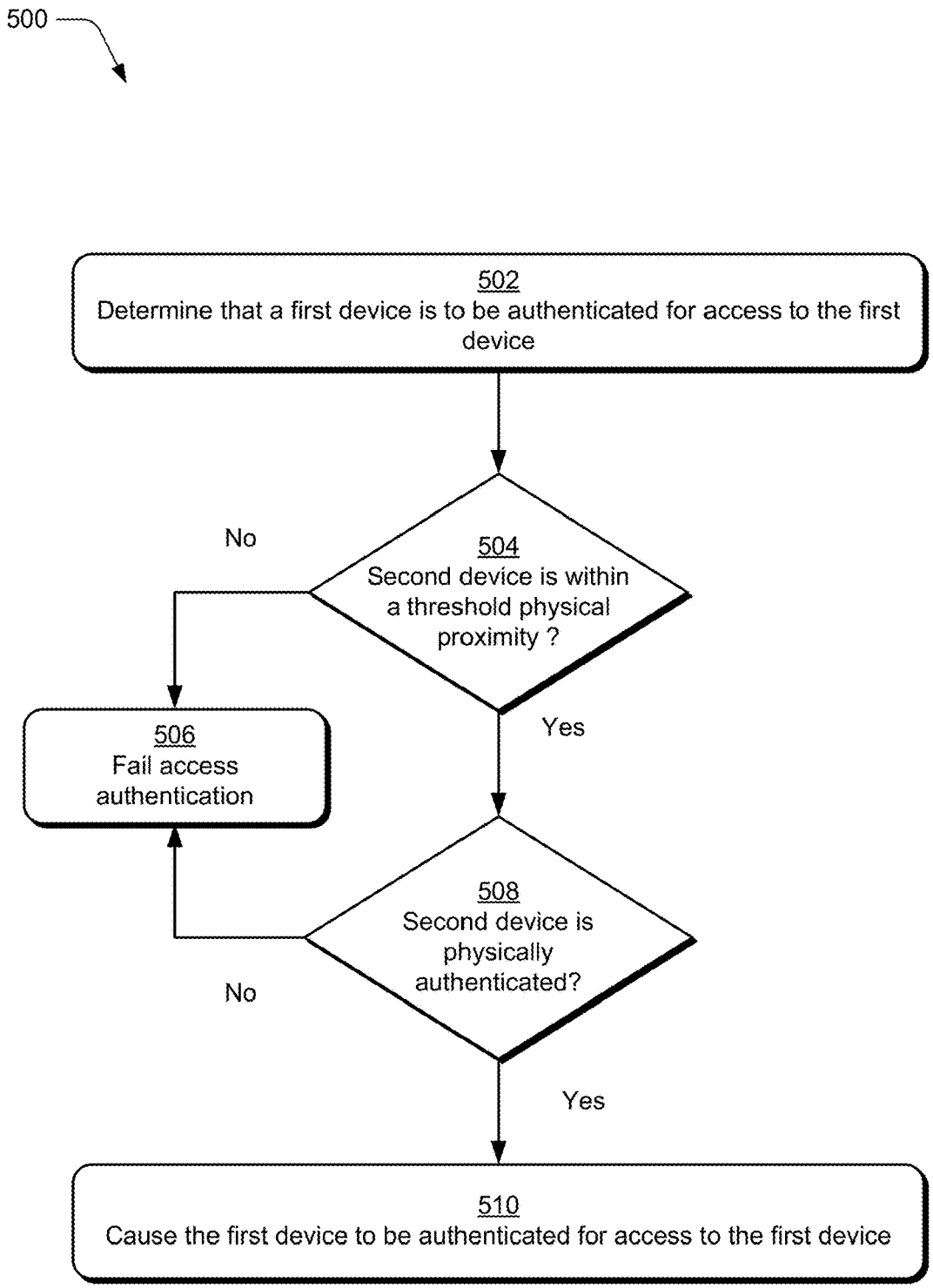
FIG. 5 illustrates an example method describing example operations of techniques described herein in accordance with one or more implementations.

FIG. 5 illustrates example method 500 describing example operations for authentication for device access. At 502, it is determined that a first device is to be authenticated for access to the first device. The user 108, for instance, interacts with the client device 102 to indicate a request to access functionality and/or content via the first device. In at least one implementation, this includes a local authentication at the client device 102, such as the client authentication module 114 presenting an authentication prompt (e.g., a login prompt such as a login window), and the user 108 inputting a valid authentication factor 124.

At 504, it is ascertained whether a second device is within a threshold physical proximity to the first device. Generally, the threshold physical proximity may be defined in various ways, such as a discrete physical distance of n feet, n meters, and so on. Alternatively or in addition, the threshold physical proximity may be determined based on a detected physical relationship between the client device 102 and the assistant device 104, such as whether a physical attribute of the assistant device 104 (e.g., a visual and/or logical presence of the assistant device 104) is detectable by the client device 102, and/or vice-versa.

For example, the client authentication module 114 leverages the proximity module 118 to perform a proximity process on the client device 102 for determining a physical distance between the client device 102 and the assistant device 104. To perform the proximity process, the proximity module 118 can leverage various types of data available to the client device 102, such as sensor data from the client sensors 110, wireless data from the client wireless module 112, data retrieved from the assistant device 104, and so forth.

Alternatively or in addition, the assistant authentication module 132 leverages the proximity module 140 to perform a proximity process to determine a physical distance between the assistant device 104 and the client device 102. To perform the proximity process, the proximity module 140 can leverage various types of data available to the assistant device 104, such as sensor data from the assistant sensors 128, wireless data from the assistant wireless module 132, data retrieved from the client device 102, and so forth. Thus, a proximity process may be performed solely at the client device 102, solely at the assistant device 104, or via cooperation between the client device 102 and the assistant device 104.

If the second device is not within a threshold physical proximity to the first device ("No"), at 506 the access authentication fails. The client authentication module 114, for instance, determines that the assistant device is outside of the threshold proximity to the client device 102, and thus does not allow the access authentication to continue and the user 108 is thus not authenticated for the requested access to the client device 102. In at least one implementation, an error notification can be output on the client device 102 indicating why the authentication failed, e.g., because the physical distance between the client device 102 and the assistant device 104 is outside of a threshold physical proximity. In such a case, the user 108 may physically move the assistant device 104 closer to the client device 102 and reinitiate the access authentication process.

If the second device is within the threshold physical proximity to the first device ("Yes"), at 508 it is determined whether the second device is physically authenticated relative to a user of the first device. The client authentication module 114, for instance, queries the assistant device 104 whether the user 108 is physically authenticated to the assistant device 104. As discussed throughout, physical authentication can be determined in different ways, such as based on detecting physical contact between the user 108 and the assistant device 104, and/or that the user 108 is in physical possession of the assistant device 104.

If the second device is not physically authenticated relative to the user of the first device ("No"), at 506 the access authentication fails. The client authentication module 114, for instance, determines that the user 108 is not authenticated to the assistant device 104, and thus does not allow the access authentication to continue and the user 108 is thus not authenticated for the requested access to the client device 102. For example, the assistant device 104 communicates a notification to the client device 102 indicating that the user 108 is not physically authenticated to the assistant device 104.

In at least one implementation, an error notification can be output on the client device 102 indicating why the authentication failed. For instance, the client authentication module 114 can output a notification that indicates that the access authentication failed because the user 108 is not detected in physical contact with the assistant device 104, and/or that the user 108 is not detected in possession of the assistant device 104. In such a case, the user 108 may perform an action to physically authenticate with the assistant device 104, such as to initiate physical contact and/or physical possession of the assistant device 104. Thus, if the user successfully physically authenticates with the assistant device 104, the access authentication process may continue or return to step 504.

If the second device is physically authenticated relative to the user of the first device ("Yes"), at 510 the first device is caused to be authenticated for access to the first device. The client device 102, for instance, receives a notification from the assistant device 104 indicating that the user 108 is physically authenticated to the assistant device 104. Accordingly, the user 108 is authenticated and is permitted access to functionality and/or content of the client device 102. Generally, this authentication can enable various types of accesses on the client device 102, such as unlocking the client device 102 from a locked state, enabling access to the secure content 126, enabling access to privileged functionality of the client device 102 (e.g., particular apps and/or services), and so forth.

Thus, in at least one implementation, the access authentication involves 3-factor authentication including local authentication at the client device 102 (e.g., via entry of a authentication factor 124 or set of authentication factors 124), the assistant device 104 being within a threshold proximity to the client device 102, and the user 108 being physically authenticated with the assistant device 104. The order of occurrence of these conditions depicted in the method 500 is not to be construed as limiting, and the conditions may occur in any particular order to enable access authentication. Generally, if any one of these factors fails at some point, the access authentication may be withdrawn. For instance, consider the following example implementation.

Figure 6:
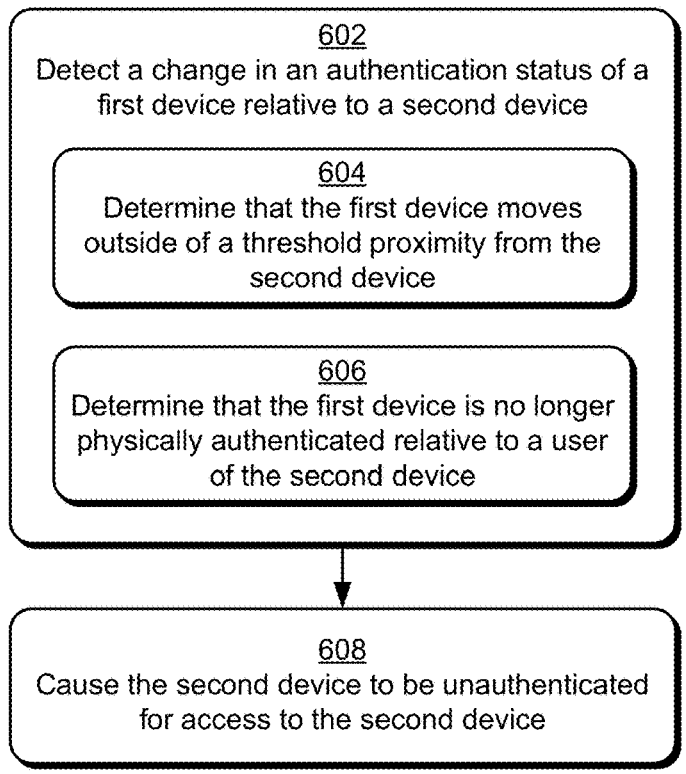
FIG. 6 illustrates an example method describing an implementation for a change in an authentication status in accordance with one or more implementations described herein.

FIG. 6 illustrates an example method 600 describing an implementation for a change in an authentication status. The method, for instance, represents an extension of the method 500, discussed above. At 602, a change in an authentication status of a first device relative to a second device is detected. For instance, at 604 it is determined that the first device moves outside of a threshold proximity from the second device. Generally, this can be detected in different ways. For instance, while the client device 102 is in an access authenticated mode (such as based on the process described in method 500), the client device 102 can periodically perform a proximity check to determine whether the assistant device 104 is still within a threshold proximity to the client device 102. Different ways of determining device proximity are discussed above, and may be performed by the client device 102 and/or the assistant device 104. In at least one implementation, the assistant device 104 can monitor a distance between the assistant device 104 and the client device 102, and can transmit a notification to the client device 102 when the distance becomes greater than the threshold proximity.

Alternatively or in addition, at 606 it is determined that the first device is no longer physically authenticated relative to a user of the second device. The assistant device 104, for example, detects that the assistant device 104 is no longer in physical contact with the user 108 and/or in physical possession by the user 108. In at least one implementation, the assistant authentication module 132 performs a periodic check for physical authentication, and if the periodic check fails (e.g., no indicators of physical authentication are detected), the assistant authentication module 132 updates a status of the assistant device 104 as not physically authenticated. Thus, the assistant device 104 can transmit a notification to the client device 102 indicating that the assistant device 104 is not authenticated to the user 108.

At 608, the second device is caused to be unauthenticated for access to the second device. For instance, in response to detecting the change in authentication status of the assistant device (e.g., based on the change in distance and/or physical authentication), the client authentication module 114 updates an authentication status of the client device 102 as unauthenticated. Generally, this may cause various changes in device state of the client device 102, such as transitioning the client device 102 from an unlocked state to a locked state, and/or preventing access to the secure content 126 on the client device 102.

In at least one implementation, the client authentication module 114 can output a notification that indicates that the access authentication failed due to a change in an authentication status of the assistant device 104. The notification may also specify why the authentication failed, such as that a change in physical authentication of the assistant device 104 was detected, and/or that the assistant device 104 moved outside of a threshold proximity from the client device 102. In such case, the user 108 may re-initiate physical authentication with the assistant device 104 to restore access authentication with the client device 102, or to reinitiate the access authentication process discussed in the method 500.

Figure 7:
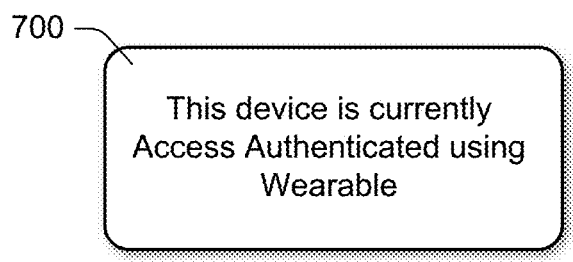
FIG. 7 depicts a status notification that includes an indication that a device is currently access authenticated in accordance with one or more implementations described herein.

FIGS. 7-10 depict different notifications that can be presented as part of implementing various aspects of authentication for device access. In at least some implementations, the notifications are configured for output on the client device 102. For instance, FIG. 7 depicts a status notification 700 that includes an indication that the client device 102 is currently access authenticated for access to functionality and/or content that requires access authentication. Further, the status notification 700 identifies an assistant device that enables the access authentication, which in this example is an assistant device 104 named "Wearable." In at least one implementation, the status notification 700 is output via the client device 102 when different conditions for access authentication are satisfied, such as described with reference to the method 500.

Figure 8:
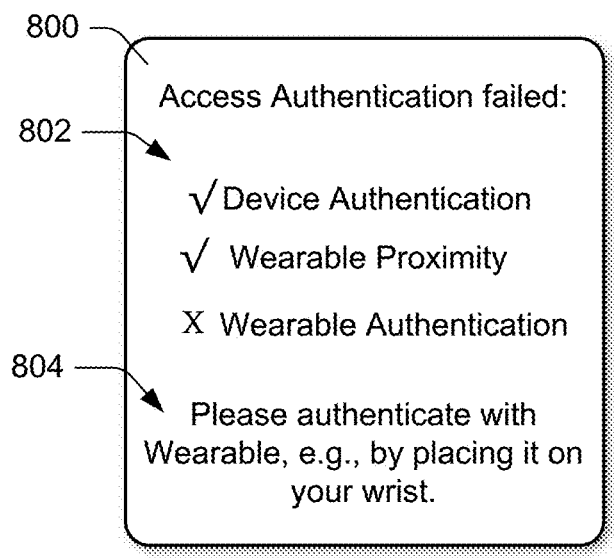
FIG. 8 depicts a failure notification that indicates a failure in an access authentication process in accordance with one or more implementations described herein.

FIG. 8 depicts a failure notification 800 that indicates a failure in an access authentication process. The failure notification 800, for instance, is output when a user requests access to functionality and/or content that is access authentication protected, but the conditions for access authentication are not satisfied. The failure notification 800 may also be output when the client device 102 is in an access authenticated state, but then a condition of access authentication subsequently fails.

The failure notification 800 includes a status field 802 that indicates a status of different conditions for access authentication. For instance, successful access authentication is based on satisfaction of multiple authentication factors, including device authentication at the client device 102, proximity of the assistant device 104 (e.g., "Wearable") being within a threshold proximity, and physical authentication of the user 108 at the assistant device 104. In this particular example, the status field 802 indicates that device authentication and Wearable proximity are satisfied, but that Wearable authentication is not. Thus, the failure notification 800 presents a status suggestion 804, which represents a suggestion for correcting the failure in the access authentication. The status suggestion 804, for instance, identifies an action that can rectify a failed authentication condition identified in the status field 802. Further to the current example, the status suggestion 804 indicates that physical authentication with the Wearable would assist in performing successful access authentication.

Figure 9:
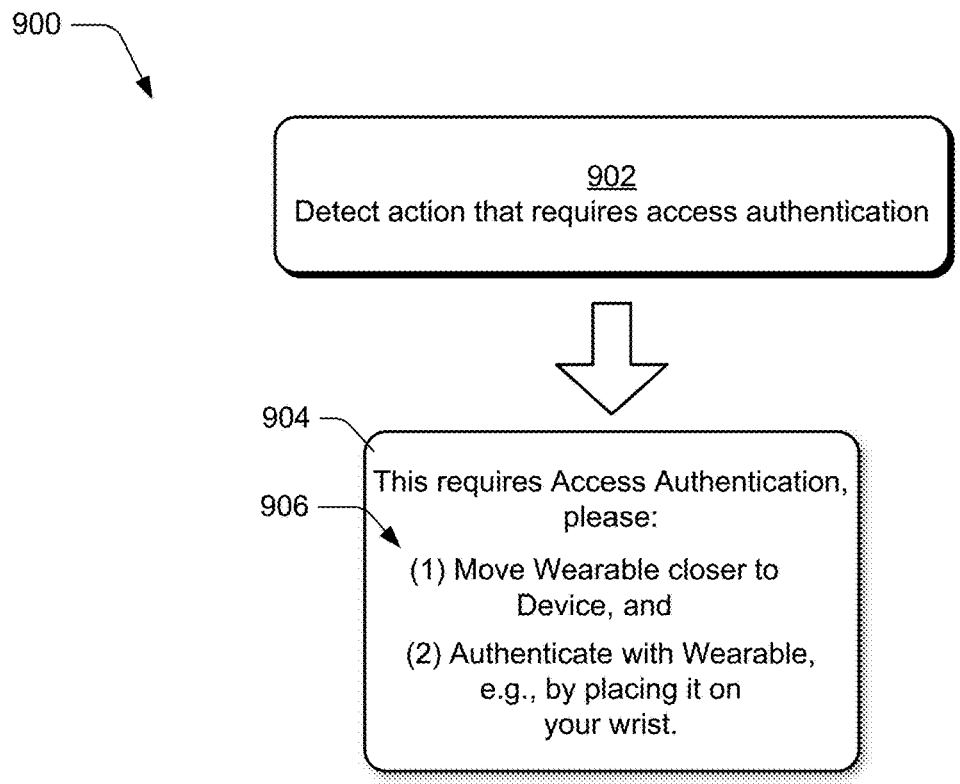
FIG. 9 depicts an example scenario for providing instructions to enable access authentication in accordance with one or more implementations described herein.

FIG. 9 depicts an example scenario 900 for providing instructions to enable access authentication. In the scenario 900, at 902 an action that requires access authentication is detected. The client authentication module 114, for instance, detects that the user 108 requests access to functionality and/or content that requires access authentication, and that the client device 102 is not currently in an access authenticated state. Accordingly, the client authentication module 114 outputs an access notification 904 that indicates that access authentication is required for the requested action. Further, the access notification 904 includes an access instruction 906 that includes an instruction for enabling access authentication and thus allowing the requested action to be performed. In this particular example, the access instruction 906 suggests that the user bring the assistant device 104 within a threshold proximity to the client device 102, and physically authenticate with the assistant device 104. In at least one implementation, if the user 108 successfully performs the actions identified in the access instruction 906, the client device 102 is automatically access authenticated and the original requested action is executed on the client device 102.

Figure 10:
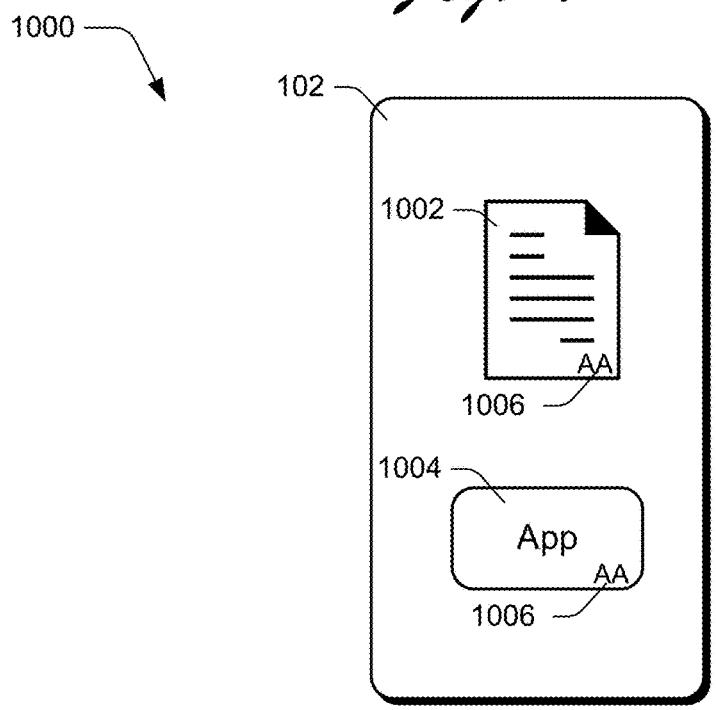
FIG. 10 depicts a scenario in which a device displays a content representation and a functionality representation in accordance with one or more implementations described herein.

FIG. 10 depicts a scenario 1000 in which the client device 102 displays a content representation 1002 and a functionality representation 1004. The content representation 1002, for instance, is an icon that represents an instance of digital content that is accessible via the client device 102, such as a document, an image, audio, multimedia, and so forth. The functionality representation 1004 generally represents functionality that is accessible via the client device 102, such as an application or service. In this particular example, the functionality representation 1004 is an application icon (e.g., a tile) that is selectable to launch an application on the client device 102.

The content representation 1002 and the functionality representation 1004 each include a separate instance of an authentication indicator 1006 that provides an indication that access authentication is required for the client device 102 to allow access to content represented by the content representation 1002, and functionality represented by the functionality representation 1004. The authentication indicator 1006, for instance, is a visual annotation (e.g., a badge) that is appended to each of the content representation 1002 and the functionality representation 1004.

For instance, consider that in the scenario 1000, the client device 102 is initially not in an access authenticated state. Accordingly, if the user selects one of the content representation 1002 or the functionality representation 1004, the client authentication module 114 can initiate a process to attempt to access authenticate the client device 102. For instance, the method 500 can be initiated. Additionally and/or alternatively, the scenario 900 can be implemented and the user 108 can be prompted to perform an action to enable the client device 102 to be access authenticated.

While the various notifications detailed above are discussed in the context of visual notifications, it is to be appreciated that the notifications can additionally or alternatively be provided in other forms, such as audible notifications, tactile notifications, and so forth.

Figure 11:
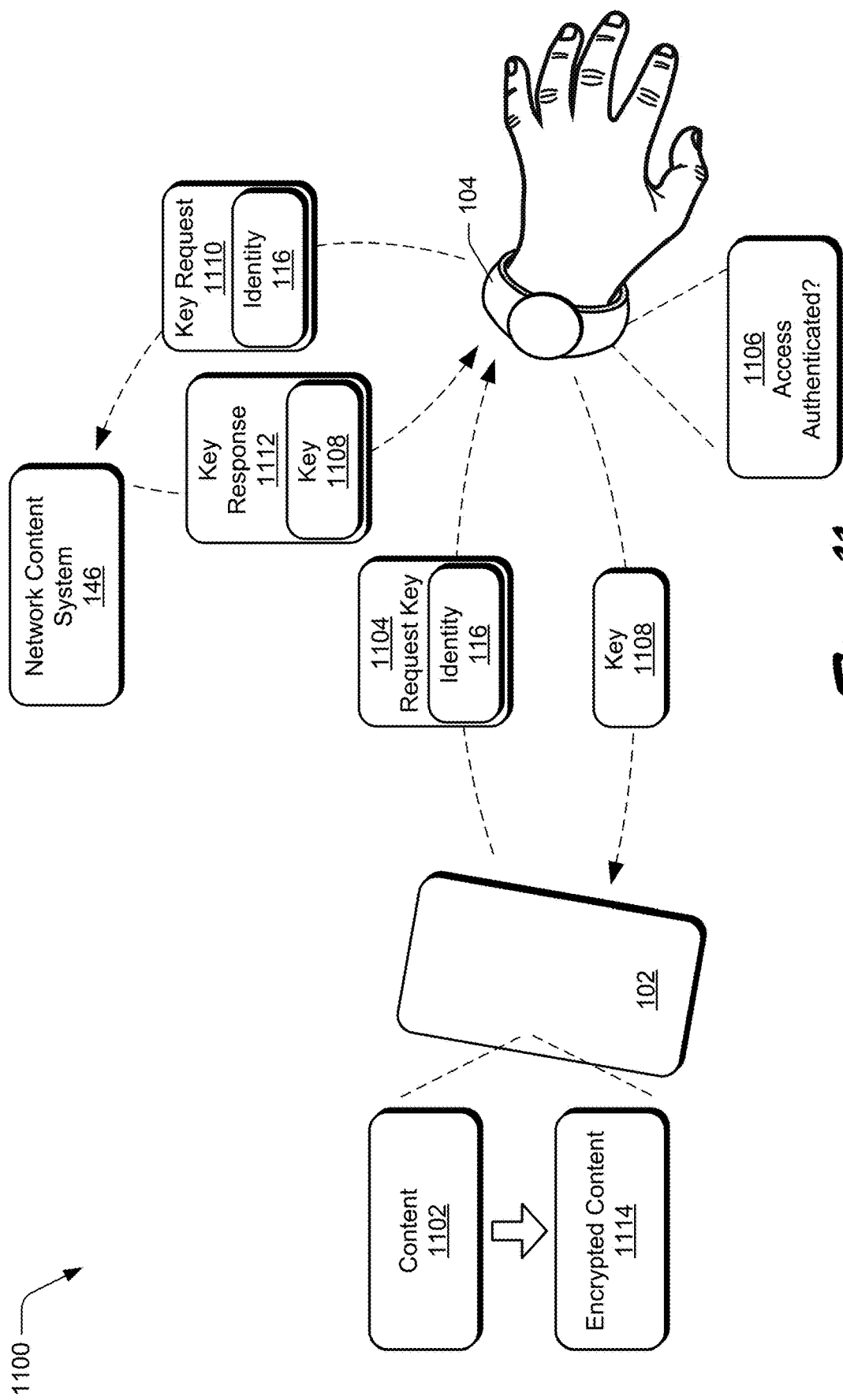
FIG. 11 depicts an example system for securing data using a key in accordance with one or more implementations described herein.

FIG. 11 depicts an example system 1100 for securing data using a key. In the system 1100, the user 108 has digital content 1102 to be secured via the client device 102 such that access to the digital content 1102 is to be limited to certain entities, such as to the user 108 and/or a group of users authorized by the user 108. Accordingly, to enable the digital content 1102 to be secured, the digital content 1102 is to be encrypted. Thus, the system 1100 depicts a few different ways in which encryption of the digital content 1102 can be accomplished.

For instance, in an example implementation, the client device 102 and the assistant device 104 can interact to enable encryption of the digital content 1102. Accordingly, at 1104 the client authentication module 114 transmits a key request to the assistant device 104 for a key for encrypting the digital content 1102. In at least one implementation, the request 1104 includes an identity 116, such as the user identity 120 for the user 108 and/or a group identity 122. For instance, if the user 108 wishes to restrict access to the digital content 1102 to the user 108, the user can specify that the user identity 120 is to be used for securing the digital content 1102. Alternatively or in addition, if the user 108 would like to enable a particular group of entities to access the digital content 1102, the user 108 can specify a group identity 122 to be used for securing the content. Thus, in the discussion below, the identity 116 may refer to the user identity 120 and/or a group identity 122.

Accordingly, to determine whether to provide a key to the client device 102, at 1106 the assistant authentication module 132 determines whether the client device 102 is access authenticated to the client device 102. As detailed above, access authentication can be based on both device proximity and physical authentication of the user 108 to the assistant device 104.

Based on determining that the client device 102 is access authenticated relative to the assistant device 104, the assistant authentication module 132 obtains a key 1108 and transmits the key 1108 to the client device 102. In at least one implementation, the assistant authentication module 132 obtains the key 1108 via interaction with the key management module 134. For instance, the assistant authentication module 114 requests a key from the key management module 134, and the key management module 134 returns an instance of the keys 144 to the assistant authentication module 132. Accordingly, the assistant authentication module 132 associates the key 1108 with the identity 116 in the identity/key table 142, and transmits the key 1108 to the client device 102. Thus, the key 1108 may be generated and managed locally on the assistant device 104.

In an alternative or additional implementation, the key 1108 may be obtained from the key manager service 150 of the network content system 146. For instance, the assistant authentication module 132 transmits a key request 1110 that includes the identity 116 to the key manager service 150, and the key manager service 150 obtains and/or generates the key 1108 from the keys 154. Further, the key manager service 150 associates the key 1108 with the identity 116 in the identity/key table 152. The key manager service 150 then transmits a key response 1112 that includes the key 1108 to the assistant device 104, and the assistant device 104 forwards the key 1108 to the client device 102.

After receiving the key 1108 at the client device 102, the client authentication module 114 encrypts the digital content 1102 with the key 1108 to generate encrypted content 1114. The encrypted content 1114, for instance, represents an instance of the secure content 126. After this, the client authentication module 114 deletes the key 1108 from the client device 102. The client authentication module 114, for instance, overwrites the data of the key 1108 such that the key 1108 is no longer accessible locally on the client device 102. Thus, the encrypted content 1114 can be stored locally on the client device 102, but the client authentication module 114 cannot decrypt the encrypted content 1110 without obtaining the key 1108 from an external source, such as described below.

Figure 12:
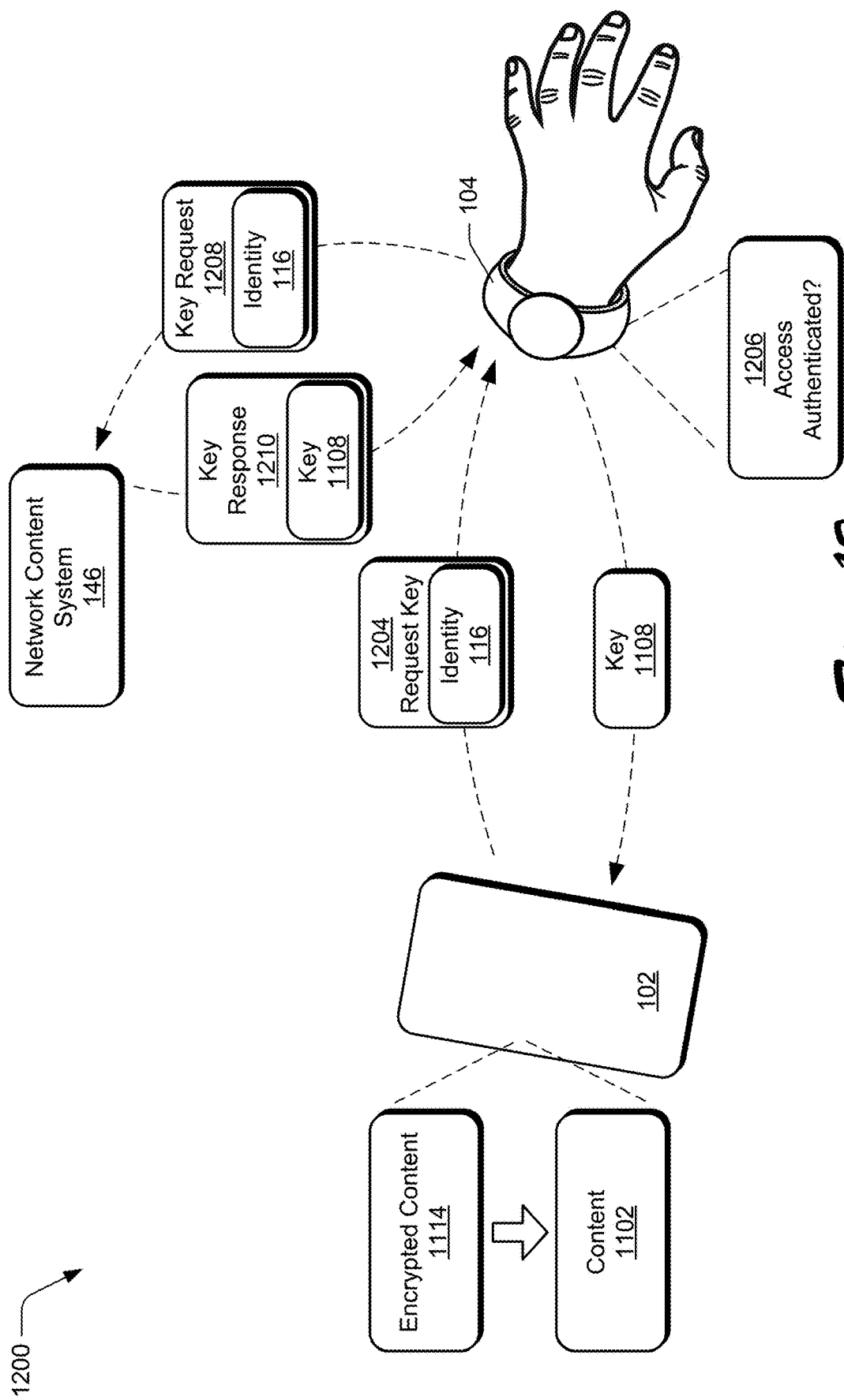
FIG. 12 depicts a system for accessing secure content in the clear in accordance with one or more implementations described herein.

FIG. 12 depicts a system 1200 for accessing secure content in the clear. The system 1200, for instance, represents a continuation of the system 1100 discussed above. In the system 1200, an access request 1202 to access the encrypted content 1114 in the clear is received via the client device 102. The user 108, for instance, requests access to a decrypted version of the encrypted content 1114. In at least one implementation, the access request 1202 can request access on behalf of the user identity 120 and/or a group identity 122.

Accordingly, the client device 102 transmits a key request 1204 with the identity 116 to the assistant device 104. For instance, since the key 1108 was deleted from the client device 102 after encrypting the encrypted content 1114, the client device 102 will subsequently seek access to the key 1108 from a remote source, such as the assistant device 104 and/or the key manager service 150. Based on the key request 1204, the assistant authentication module 132 determines at 1206 whether the client device 102 is access authenticated, examples of which are detailed above.

After determining that the client device 102 is access authenticated, the assistant device 104 obtains the key 1108 and transmits the key 1108 back to the client device 102. In at least one implementation, the assistant authentication module 132 obtains the key 1108 by using the identity 116 to look up and obtain the key 1108 from the identity/key table 142.

Alternatively or in addition, the assistant device 104 transmits a key request 1208 with the identity 116 to the key manager service 150, and the key manager service 150 uses the identity 116 to perform a lookup and obtain the key 1108 from the identity/key table 152. The key manager service 150 then transmits a key response 1210 that includes the key 1108 to the assistant device 104, which then forwards the key 1108 to the client device 102. As yet another implementation, the client device 102 itself can communicate with the key manager service 150 to obtain the key 1108 in a manner similar to that of the assistant device 104.

Accordingly, after receiving the key 1108 from the assistant device 104 or the key manager service 150, the client authentication module 114 utilizes the key 1108 to decrypt the encrypted content 1114 to obtain the digital content 1102, which generally represents a decrypted version of the encrypted content 1114 that is consumable in the clear. In at least one implementation, after decrypting the encrypted content 1114, the client authentication module 114 deletes and/or overwrites data of the key 1108 such that the key is no longer locally available on the client device 102.

While the system 1200 is discussed with reference to a request from the user 108 for access to the digital content 1102, the system may also be implemented to enable other users to request access to the content. For example, consider an implementation where in the system 1100 described previously, a group identity 122 is used for securing the digital content 1102 and thus the group identity 122 is linked in the identity/key table 142 and/or the identity/key table 152 with the key 1108. Thus, when a user different than the user 108 that is authenticated to the group identity 122 requests access to the digital content 1102 utilizing the group identity 122, the system 1200 can be leveraged to provide the different user with the key 1108 that is then usable to decrypt the encrypted content 1114 and obtain the digital content 1102. Accordingly, the system 1200 may be implemented with a different instance of a client device 102 and a different instance of an assistant device 104 that are associated with (e.g., in possession of) the different user.

Figure 13:
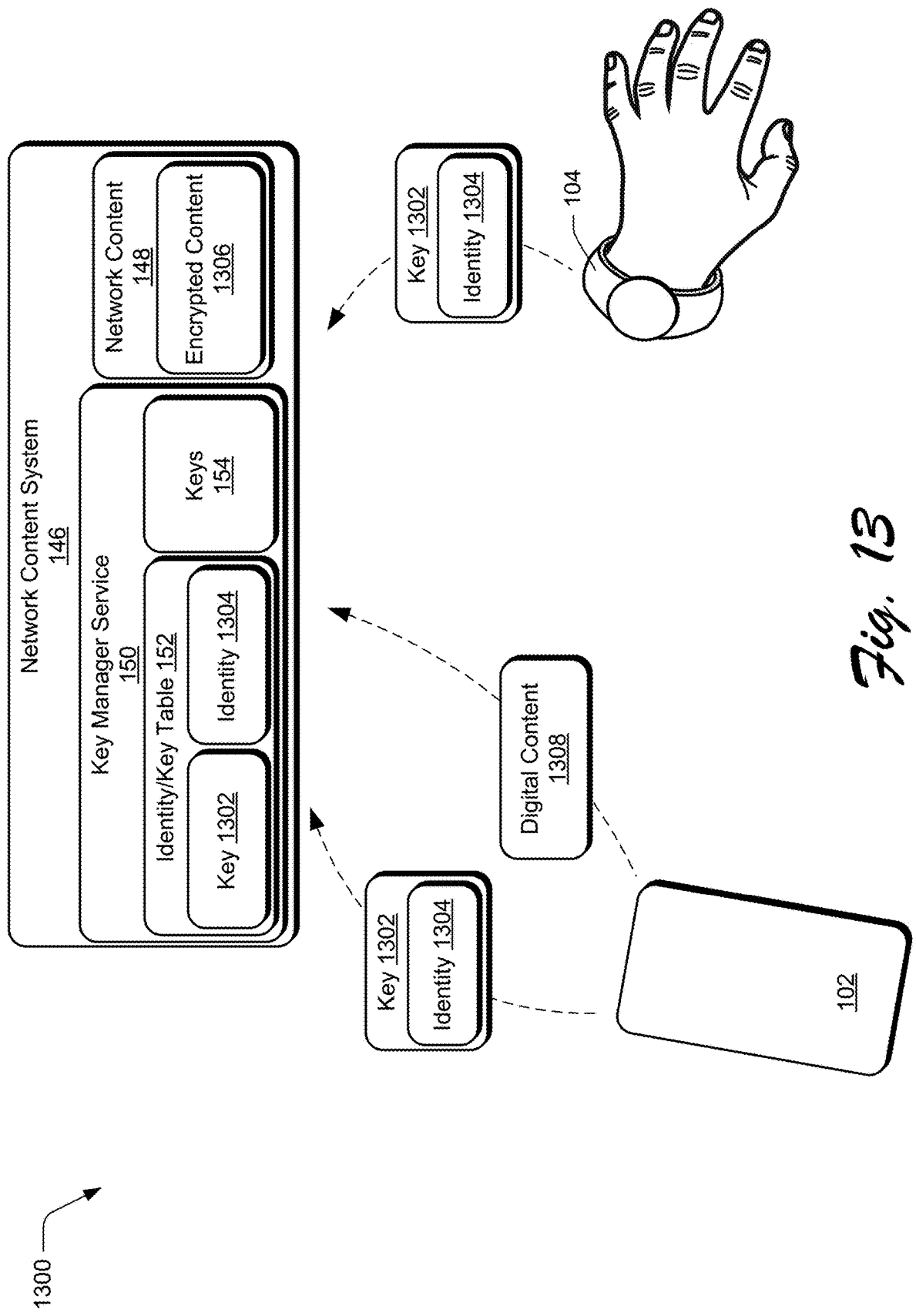
FIG. 13 depicts a system for utilizing a network service for managing secure content in accordance with one or more implementations described herein.

FIG. 13 depicts a system 1300 for utilizing a network service for managing secure content. The system 1300, for example, represents an alternative or additional implementation to the systems 1100, 1200 detailed above. In the system 1300, the key manager service 150 is provisioned with a key 1302 for use in encrypting and decrypting digital content. Generally, the key 1302 may be provisioned to the key manager service 150 in different ways. For instance, the key manager service 150 can generate the key 1302 itself and provide a copy of the key 1302 to the assistant device 104. In a further implementation, the key management module 134 of the assistant device 104 can generate the key 1302, and transmit the key 1302 from the assistant device 104 to the key manager service 150.

In yet a further implementation, the client authentication module 114 can generate the key 1302, and transmit the key 1302 from the client device 102 to the key manager service 150. In such an implementation, the key 1302 can also be provisioned to the assistant device 104 by the client device 102 or the key manager service 150. Further, the client authentication module 114 would delete the key 1302 from the client device 102 after the key 1302 is provisioned to the key manager service 150 and/or the assistant device 104.

As further depicted in the system 1300, the key manager service 150 links the key 1302 with an identity 1304 in the identity/key table 152. For instance, in implementations where the key 1302 is provisioned to the key manager service 150 by the assistant device 104, the assistant device 104 can include the identity 1304 to be bound to the key 1302 at the key manager service 150. In implementations where the client device 102 provisions the key 1302 to the key manager service 150, the client device 102 can communicate the identity 1304 to the key manager service 150 in conjunction with the key 1302. Generally, the identity 1304 represents an implementation of an identity 116, such as an individual identity (e.g., the user identity 120) or a group identity 122.

Further to the system 1300, the network content system 146 includes encrypted content 1306 that is encrypted using the key 1302. The encrypted content 1306 represents an encrypted version of digital content that is received from a content source such as the client device 102 or other source of digital content. For instance, the user 108 leverages the client device 102 to obtain and/or generate an instance of digital content 1308, and communicates the digital content 1308 to the network content system 146. The key manager service 150 then encrypts the digital content 1308 to generate the encrypted content 1306, which is maintained as part of the network content 148.

Figure 14:
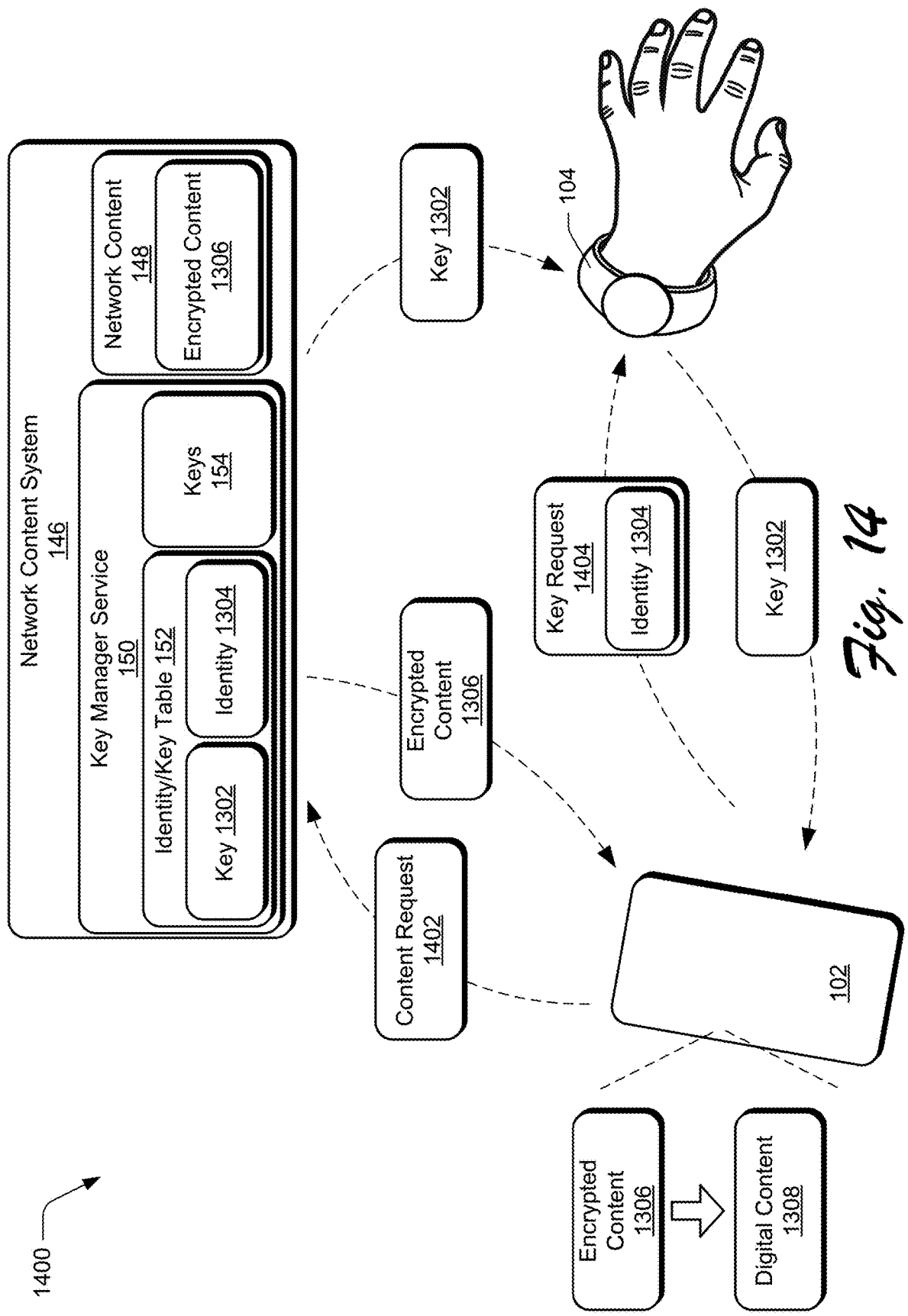
FIG. 14 depicts a system for enabling secure content to be obtained from a network service in accordance with one or more implementations described herein.

FIG. 14 depicts a system 1400 for enabling secure content to be obtained from a network service. The system 1400, for instance, represents a continuation of the system 1300 discussed previously. In the system 1400, the client device 102 transmits a content request 1402 to the network content system 146. The content request 1402, for example, identifies the encrypted content 1306 and/or includes the identity 1304. Accordingly, the encrypted content 1306 is transmitted from the network content system 146 to the client device 102.

The client device 102, however, does not have the key 1302 to enable decryption of the encrypted content 1306. Accordingly, the client authentication module 114 transmits a key request 1404 with the identity 1304 to the assistant device 104. In response to the key request 1404, the assistant device 104 checks at 1406 whether the client device 102 is access authenticated. The assistant authentication module 132, for instance, determines whether a user associated with the identity 1304 is physically authenticated with the assistant device 104, and whether the assistant device 104 is within a threshold proximity to the client device 102. In an implementation where the identity 1304 is an individual identity for the user 108 (e.g., the user identity 120), the assistant authentication module 132 checks whether the user 108 is physically authenticated with the assistant device 104. In an implementation whether the identity 1304 is a group identity 122, the assistant authentication module 132 checks whether a user identified as part of the group identity 122 is physically authenticated with the assistant device 104.

Accordingly, based on determining that the client device 102 is access authenticated, the assistant device 104 transmits the key 1302 to the client device 102. The client authentication module 114 then utilizes the key 1302 to decrypt the encrypted content 1306 to generate the digital content 1308. The digital content 1308, for instance, represents a decrypted version of the encrypted content 1306 that is consumable via the client device 102 in the clear.

In at least one implementation, after decrypting the encrypted content 1306, the client authentication module 114 deletes the key 1302 from the client device 102. Alternatively or additionally, the key 1302 is not used again and a new key for the client device 102 is provisioned to the key manager service 150, such as using a provisioning process as described with reference to the system 1300.

While implementations are discussed herein with reference to the key 1302 being used for encrypting and decrypting encrypted content, it is to be appreciated that different keys may be used for encryption and decryption, respectively. For instance, a first key may be obtained and used for encryption, and a second, different key may be obtained and used for decryption. Implementations discussed herein, for example, may use symmetrical and/or asymmetrical encryption techniques.

Figure 15:
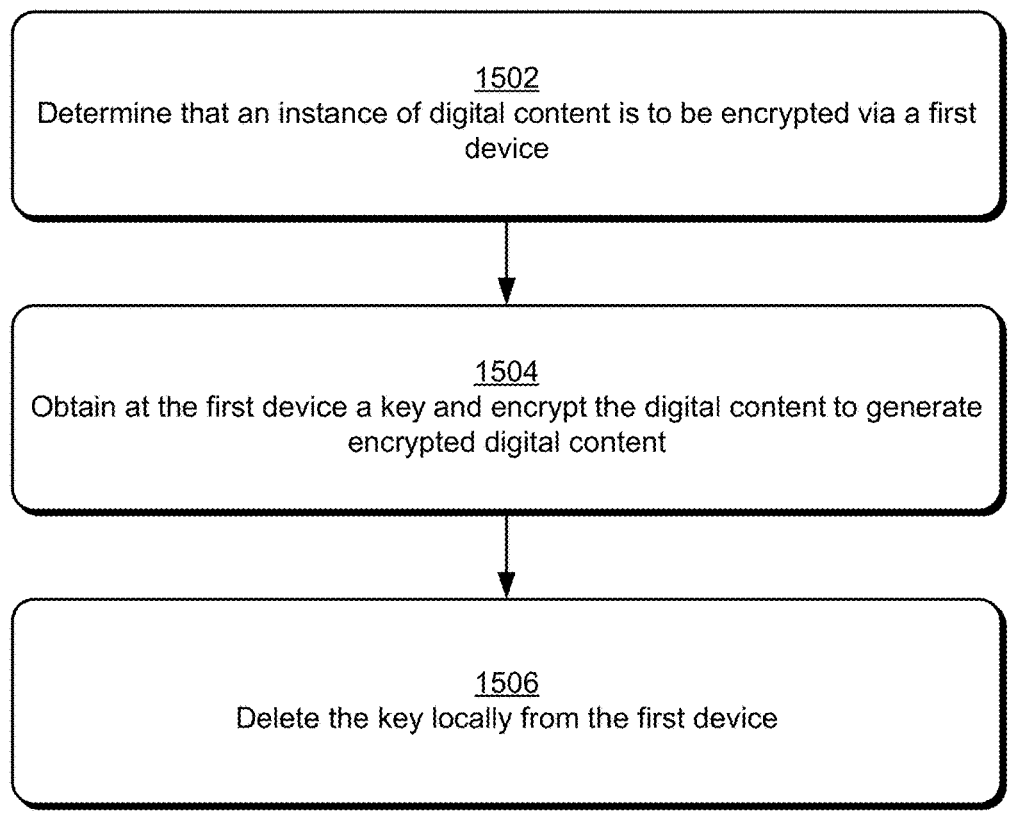
FIG. 15 illustrates an example method for enabling content to be securely maintained and accessed in accordance with one or more implementations described herein.

FIG. 15 illustrates an example method 1500 for enabling content to be securely maintained and accessed. At 1502, a determination is made that an instance of digital content is to be encrypted via a first device. The user 108, for example, requests via the client device 102 that an instance of digital content be secured.

At 1504, the first device obtains a key and encrypts the digital content to generate encrypted digital content. The client device 102, for instance, requests a key from the assistant device 104, and the assistant device 104 returns a key. The key may be associated with a particular identity, such as an individual identity 116 (e.g., the user identity 120) and/or a group identity 122. In at least one implementation, the assistant device 104 provides a key subject to the client device 102 being access authenticated relative to the assistant device 104.

At 1506, the first device deletes the key locally from the first device. The client authentication module 114, for instance, deletes the key from being stored locally on the client device 102 after generating the encrypted content. In at least one implementation, the encrypted content can be stored locally on the client device 102, but cannot be decrypted unless a key is subsequently obtained from an external source, such as the assistant device 104 and/or the key manager service 150.

Figure 16:
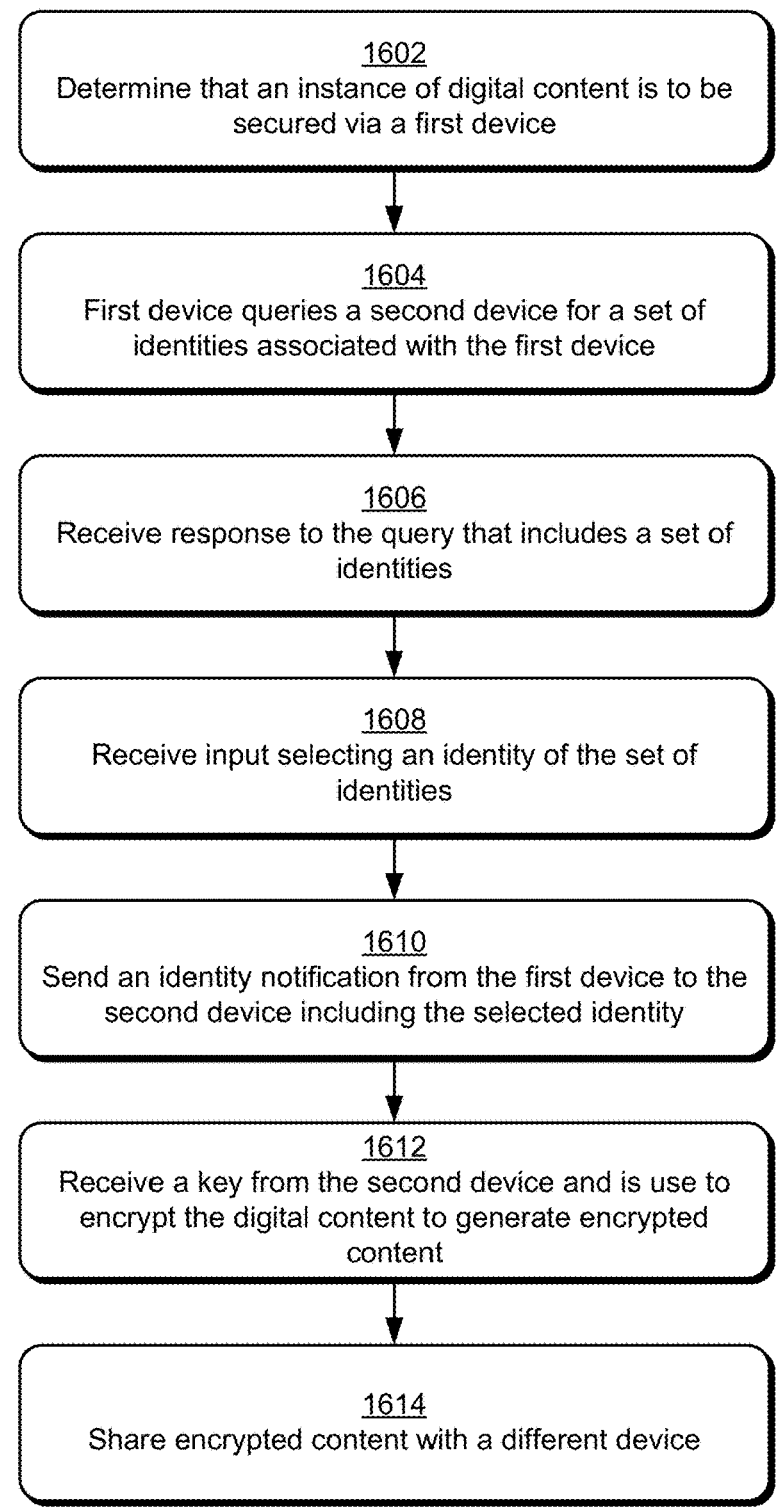
FIG. 16 illustrates an example method for identity-based securing of content in accordance with one or more implementations described herein.

FIG. 16 illustrates an example method 1600 for identity-based securing of content. At 1602, a determination is made that an instance of digital content is to be secured via a first device. The user 108, for instance, selects an instance of digital content and provides input indicating that the digital content is to be secured.

At 1604, the first device queries a second device for a set of identities associated with the first device. The client authentication module 114, for instance, determines that an identity is to be obtained for purposes of securing the digital content. Accordingly, the client authentication module 114 transmits a request to the assistant device 104 for an identity to be used for securing the digital content. In at least one implementation, the request may include a device identifier for the client device 102.

At 1606, a response to the query is received that includes a set of identities. For instance, the client authentication module 114 receives a query response from the assistant authentication module 132 with a set of available identities. The available identities, for instance, include the user identity 120 and one or more group identities 122.

At 1608, input is received selecting an identity of the set of identities. The client authentication module 114, for example, presents a graphical notification of the available identities, and the user 108 selects a particular identity or set of identities from the graphical notification.

At 1610, an identity notification is sent from the first device to the second device including the selected identity. For instance, the client authentication module 114 sends an indication of the selected identity or set of selected identities to the assistant authentication module 132. In at least one implementation, the identity is sent as part of a key request.

At 1612, a key is received from the second device and is used to encrypt the digital content to generate encrypted content. The client authentication module 114, for example, receives a key from the assistant device 104, and utilizes the key to encrypt an instance of digital content and generate encrypted content. In at least one implementation, the key is deleted from the client device 102 after encrypting the digital content.

At 1614, the encrypted content is shared with a different device. The client device 102, for example, transmits the encrypted content to a different device. For instance, in a scenario where the user 108 selects a group identity 122 to be used for securing the digital content, the encrypted content can be shared with a different device associated with the group identity 122. The different device can then obtain a key for decrypting the encrypted content, such as utilizing techniques described throughout.

Generally, the encrypted content can be shared in different ways. For instance, the user 108 can interact with the client device 102 to identity a different user with which the encrypted content is to be shared, such as via an electronic communication such as an email, an instant message, and so forth. Alternatively or additionally, the encrypted content can be shared to a group folder associated with a group identity 122, such as maintained by the network content system 146. Thus, group members that authenticate with the group identity 122 can retrieve the encrypted content.

In at least one implementation, content sharing can be based on device proximity. For instance, consider a scenario where the encrypted content is associated with a group identity 122, and the group identity 122 includes the client device 102 and another, different device. Further, consider that the client device 102 and the different device are detected within a certain proximity of each other, such as based on detecting a particular distance between the devices, such as in meters, feet, and so forth. Accordingly, based on detecting the proximity of the devices and both devices being associated with the group identity 122, the client device 102 can automatically transmit the encrypted content to the different device. This may occur automatically and independent of user input to the client device 102 directing that the encrypted content be communicated to the different device. For instance, a sharing proximity can be defined such that when a device is detected within the sharing proximity, digital content can be automatically shared between devices.

Figure 17:
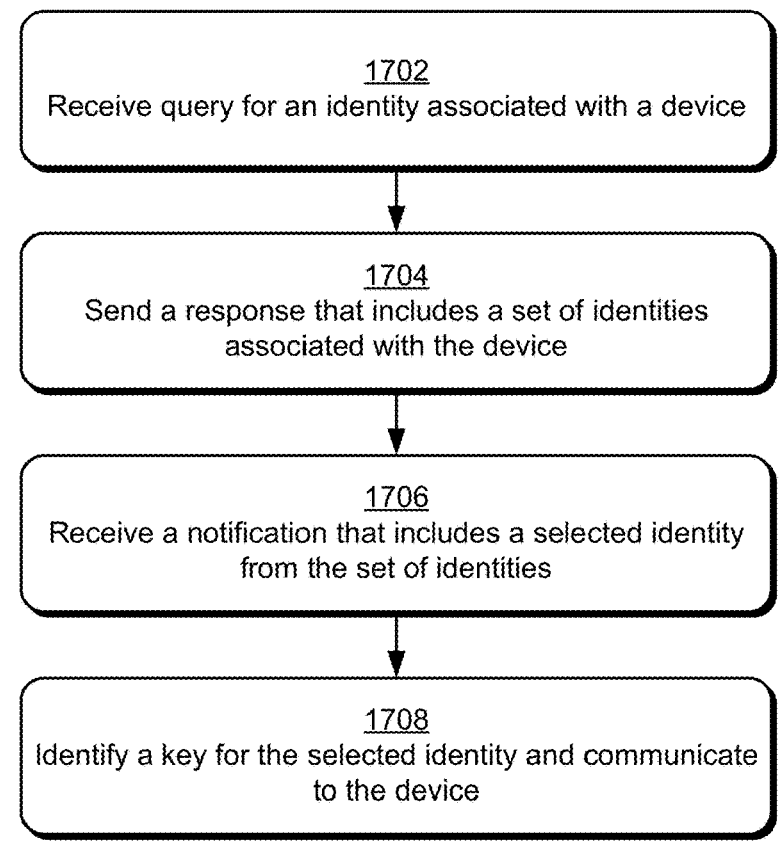
FIG. 17 illustrates an example method for providing identity-based securing of content in accordance with one or more implementations described herein.

FIG. 17 illustrates an example method 1700 for providing identity-based securing of content. The method, for instance, in performed in conjunction with the method 1600, discussed above. At 1702, a query is received for an identity associated with a device. The assistant authentication module 132, for instance, receives a query from the client authentication module 114 for an identity associated with the client device 102. The query may include some type of identifier associated with the client device 102, such as a device identifier and/or a user identifier, e.g., the user identity 120.

At 1704, a response is sent that includes a set of identities associated with the device. For example, the assistant authentication module 132 selects a set of identities associated with the client device 102 from the identity/key table 142, and communicates the identities to the client device 102. Generally, the identities may include an individual identity and/or a group identity.

At 1706, a notification is received that includes a selected identity from the set of identities. The assistant authentication module 132, for instance, receives a notification from the client authentication module 114 including a selected identity or multiple selected identities.

At 1708, a key is identified for the selected identity and communicated to the device. For example, the assistant authentication module 132 identifies the key as being associated with the selected identity in the identity/key table 142. Alternatively or in addition, the key management module 134 generates the key, and the assistant authentication module 132 records an association between the key and the selected identity in the identity/key table 142. Accordingly, the assistant device 104 transmits the key to the client device 102. As described above, the client authentication module 114 may utilize the key to encrypt digital content. Further, the assistant authentication module 132 may, at a subsequent time, provide the key to the client device 102 and/or other device to enable encrypted content to be decrypted.

Figure 18:
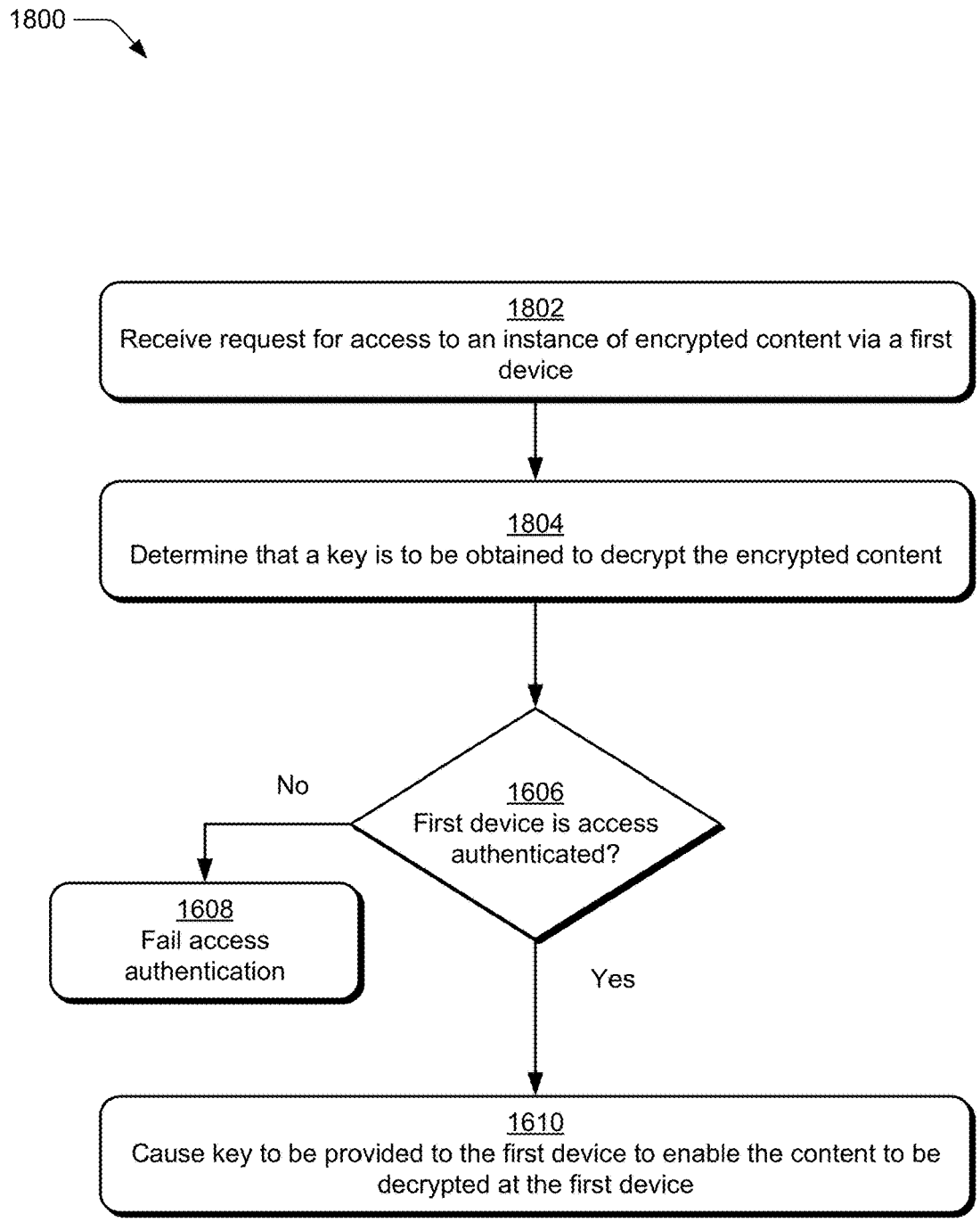
FIG. 18 illustrates an example method for enabling secure content to be accessed in accordance with one or more implementations described herein.

FIG. 18 illustrates an example method 1800 for enabling secure content to be accessed. At 1802, a request for access to an instance of encrypted content via a first device is received. The user 108, for instance, requests access to an instance of the secure content 126 via the client device 102. In at least one implementation, the encrypted content may have been received from another device. For instance, consider an example where the client device 102 is identified as part of a group identity 122 that includes multiple other individual identities. Thus, a different device associated with the group identity 122 may share the encrypted content with the client device 102. Alternatively or additionally, the encrypted content can be received from a network-based service, such as the network content system 146.

At 1804, it is determined that a key is to be obtained to decrypt the encrypted content. The client authentication module 114, for instance, transmits a key request to the assistant device 104, and the assistant authentication module 132 recognizes the key request. In at least one implementation, the key request includes an identity, such as the user identity 120 and/or a group identity 122. For instance, in a scenario where the encrypted content was received from another device associated with a particular group identity 122, the client device 102 may request a key using the particular group identity 122.

At 1806, it is ascertained whether the first device is access authenticated relative to a second device. The client authentication module 114 and/or the assistant authentication module 132, for example, ascertain whether the client device 102 is within a threshold physical proximity to the assistant device 104, and whether the assistant device 104 is physically authenticated relative to the user 108. Different aspects and variations of access authentication are detailed above.

If the first device is not access authenticated relative to the second device ("No"), at 1808 the access authentication fails and a key is not provided to the first device. As described previously, a notification may be presented that explains why the access authentication failed, and that suggests an action that can be performed to enable successful access authentication.

If the first device is access authenticated relative to the second device ("Yes"), at 1810 a key is caused to be provided to the first device to enable the content to be decrypted at the first device. For instance, based on a successful access authentication, the assistant authentication module 132 transmits a key to the client device 102. As described previously, a key may be associated with an individual identity and/or a group identity. For instance, in a scenario where the encrypted content was received from another device associated with a group identity 122, the client device 102 may receive the key based on the group identity 122. Thus, the client authentication module 114 receives the key, and utilizes the key to decrypt the encrypted content and generate decrypted digital content that can be consumed in the clear via the client device 102. In at least one implementation, after decrypting the encrypted content, the client authentication module 114 deletes the key from being stored locally on the client device 102.

Thus, implementations of authentication for device access provide ways for securing access to functionality and/or content of a device.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 19:
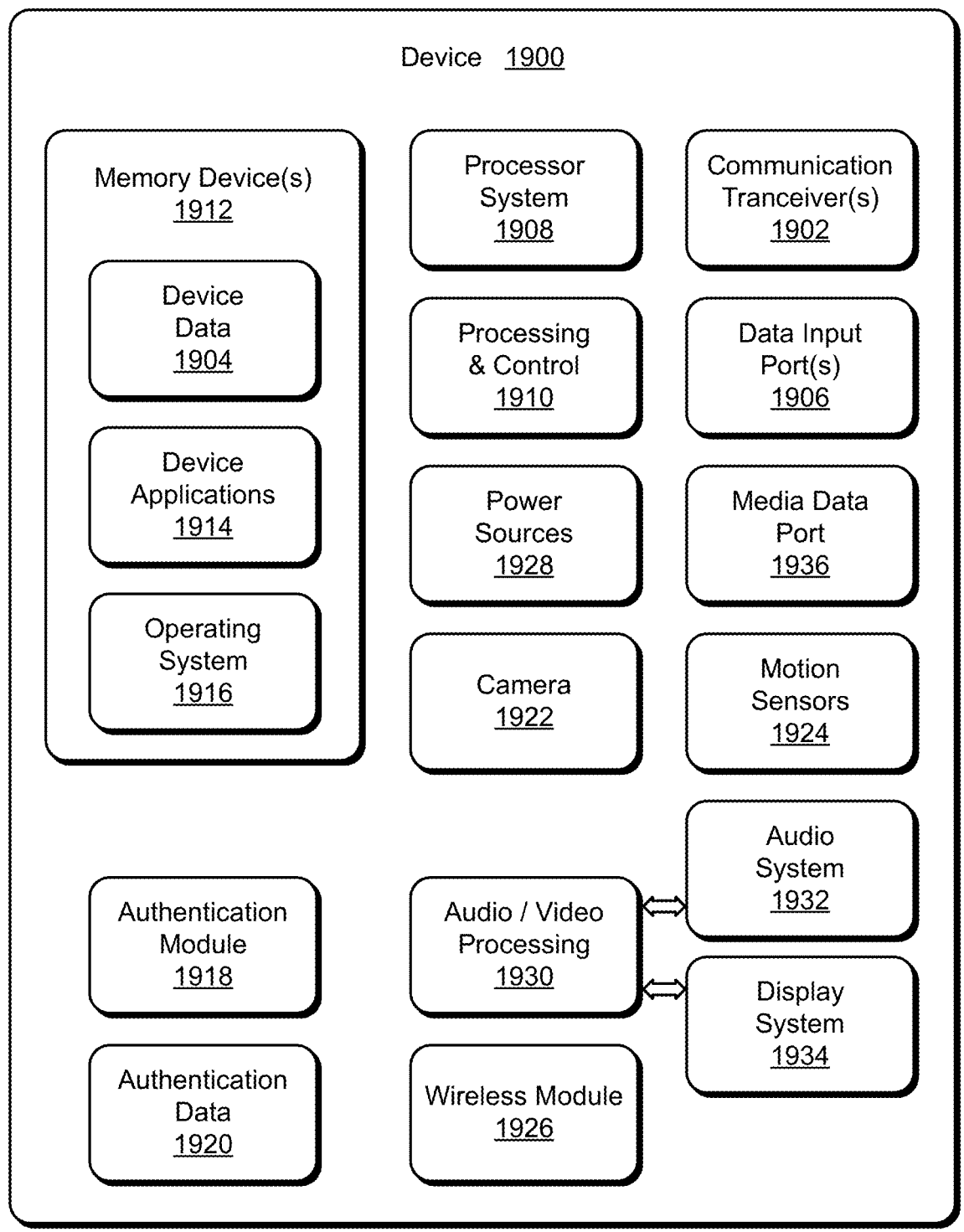
FIG. 19 illustrates various components of an example device that can implement aspects of authentication for device access.

FIG. 19 illustrates various components of an example device 1900 in which aspects of authentication for device access can be implemented. The example device 1900 can be implemented as any of the devices described with reference to the previous FIGS. 1-18, such as any type of mobile device, mobile phone, mobile device, wearable device, tablet, computing, communication, entertainment, gaming, media playback, and/or other type of electronic device. For example, the client device 102 and/or the assistant device 104 as shown and described with reference to FIGS. 1-18 may be implemented as the example device 1900. In a wearable device implementation, the device may include any one or combination of a watch, armband, wristband, bracelet, glove or pair of gloves, glasses, jewelry items, clothing items, any type of footwear or headwear, and/or other types of wearables.

The device 1900 includes communication transceivers 1902 that enable wired and/or wireless communication of device data 1904 with other devices. The device data 1904 can include any of device identifying data, device location data, wireless connectivity data, and wireless protocol data. Additionally, the device data 1904 can include any type of audio, video, and/or image data. Example communication transceivers 1902 include wireless personal area network (WPAN) radios compliant with various IEEE 1902.15 (Bluetooth™) standards, wireless local area network (WLAN) radios compliant with any of the various IEEE 1902.11 (Wi-Fi™) standards, wireless wide area network (WWAN) radios for cellular phone communication, wireless metropolitan area network (WMAN) radios compliant with various IEEE 1902.16 (WiMAX™) standards, and wired local area network (LAN) Ethernet transceivers for network data communication.

The device 1900 may also include one or more data input ports 1906 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1900 includes a processing system 1908 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1910. The device 1900 may further include any type of a system bus or other data and command transfer system that couples the various components within the device. A system bus can include any one or combination of different bus structures and architectures, as well as control and data lines.

The device 1900 also includes computer-readable storage memory 1912 (e.g., memory devices) that enable data storage, such as data storage devices that can be accessed by a computing device, and that provide persistent storage of data and executable instructions (e.g., software applications, programs, functions, and the like). Examples of the computer-readable storage memory 1912 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1900 may also include a mass storage media device.

The computer-readable storage memory 1912 provides data storage mechanisms to store the device data 1904, other types of information and/or data, and various device applications 1914 (e.g., software applications). For example, an operating system 1916 can be maintained as software instructions with a memory device and executed by the processing system 1908. The device applications may also include a device manager, such as any form of a control application, software application, signal-processing and control module, code that is native to a particular device, a hardware abstraction layer for a particular device, and so on.

Computer-readable storage memory 1912 represents media and/or devices that enable persistent and/or non-transitory storage of information in contrast to mere signal transmission, carrier waves, or signals per se. Computer-readable storage memory 1912 do not include signals per se or transitory signals.

In this example, the device 1900 includes an authentication module 1918 that implements aspects of authentication for device access, and may be implemented with hardware components and/or in software as one of the device applications 1914, such as when the device 1900 is implemented as the assistant device 104. An example, the authentication module 1918 can be implemented as the client authentication module 114 and/or the assistant authentication module 132 described in detail above. In implementations, the authentication module 1918 may include independent processing, memory, and logic components as a computing and/or electronic device integrated with the device 1900. The device 1900 also includes authentication data 1920 for implementing aspects of authentication for device access, and may include data from the authentication module 1918.

In this example, the example device 1900 also includes a camera 1922 and motion sensors 1924, such as may be implemented in an inertial measurement unit (IMU). The motion sensors 1924 can be implemented with various sensors, such as a gyroscope, an accelerometer, and/or other types of motion sensors to sense motion of the device. The various motion sensors 1924 may also be implemented as components of an inertial measurement unit in the device.

The device 1900 also includes a wireless module 1926, which is representative of functionality to perform various wireless communication tasks. For instance, for the client device 102 and/or the assistant device 104, the wireless module 1926 can be leveraged to scan for and detect wireless networks, as well as negotiate wireless connectivity to wireless networks for the client device 102 and/or the assistant device 104. The device 1900 can also include one or more power sources 1928, such as when the device is implemented as a mobile device. The power sources 1928 may include a charging and/or power system, and can be implemented as a flexible strip battery, a rechargeable battery, a charged super-capacitor, and/or any other type of active or passive power source.

The device 1900 also includes an audio and/or video processing system 1930 that generates audio data for an audio system 1932 and/or generates display data for a display system 34. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1936. In implementations, the audio system and/or the display system are integrated components of the example device. Alternatively, the audio system and/or the display system are external, peripheral components to the example device.

Although implementations of authentication for device access have been described in language specific to features and/or methods, the subject of the appended claims is not necessarily limited to the specific features or methods described. Rather, the features and methods are disclosed as example implementations of authentication for device access, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method, including: determining that a first device is to be authenticated for access to the first device; ascertaining whether a second device is within a threshold physical proximity to the first device; determining, responsive to ascertaining that the second device is within the threshold physical proximity to the first device, whether the second device is physically authenticated relative to a user of the first device; and causing the first device to be authenticated for access to the first device based on determining that the second device is physically authenticated relative to the user of the first device.

In addition to the previously described methods, any one or more of the following: wherein said determining that the first device is to be authenticated for access to the first device includes determining that a user is requesting access to one or more of functionality or content that is accessible via the first device; wherein the threshold physical proximity includes a threshold distance between the first device and the second device; wherein said ascertaining whether the second device is within a threshold physical proximity to the first device is based on a proximity process performed by the first device to ascertain a physical distance between the first device and the second device; wherein said ascertaining whether the second device is within a threshold physical proximity to the first device is based on a proximity process performed by the second device to ascertain a physical distance between the first device and the second device; wherein said determining whether the second device is physically authenticated relative to a user of the first device includes determining whether the second device is in physical contact with the user of the first device; wherein said determining whether the second device is physically authenticated relative to a user of the first device includes determining whether the user of the first device is in possession of the second device; wherein said causing the first device to be authenticated for access to the first device is based on the second device being within the threshold proximity to the first device, and the second device being physically authenticated relative to the user of the first device; further including: determining one or more of that the second device moves outside of the threshold proximity from the first device, or that the second device is no longer physically authenticated relative to the user; and causing the first device to become unauthenticated for the access to the first device; further including presenting a notification that indicates a reason why the first device is unauthenticated, and that includes a suggested action for reauthenticating the first device.

A system including: a wireless radio system to transmit and receive wireless signal; a sensor system; and an authentication module implemented to: determine that a first device is to be authenticated for access to the first device; ascertain, based on one or more of wireless data received via the wireless radio system, or sensor data obtained via the sensor system, that the first device is within a threshold physical proximity to a second device and that the second device is physically authenticated relative to a user of the first device; and cause the first device to be authenticated for access to the first device based on ascertaining that the first device is within the threshold proximity and that the second device is physically authenticated relative to the user.

In addition to the previously described systems, any one or more of the following: wherein the authentication module is implemented to determine that the first device is to be authenticated for access to the first device based on a request for secure content at the first device; wherein the authentication module is implemented to determine that the first device is to be authenticated for access to the first device based on a local authentication at the first device; wherein the authentication module is implemented to ascertain that the first device is within the threshold proximity based on one or more of a proximity process performed at the first device, or a proximity process performed at the second device; wherein the authentication module is implemented to ascertain that the second device is physically authenticated relative to the user of the first device based on one or more of detecting physical contact between the user and the second device, or detecting physical possession of the second device by the user; wherein the authentication module is further implemented to. determine one or more of that the second device moves outside of the threshold proximity from the first device, or that the second device is no longer physically authenticated relative to the user; and cause the first device to become unauthenticated for the access to the first device.

A method including: determining, based on a local authentication at a first device, that the first device is to be authenticated for access to the first device; ascertaining that the first device is within a threshold proximity to a second device and that the second device is physically authenticated relative to a user of the first device; and causing the first device to be authenticated for access to the first device based on ascertaining that the first device is within the threshold proximity and that the second device is physically authenticated relative to the user.

In addition to the previously described methods, any one or more of the following: wherein said ascertaining that the first device is within the threshold proximity is based on one or more of a determination at the first device of a physical distance between the first device and the second device, or a query from the first device to the second device for a physical distance between the second device and the first device; wherein said causing the first device to be authenticated for access to the first device is based on the local authentication at the first device, the first device being within the threshold proximity to the second device, and the second device being physically authenticated relative to the user of the first device; further including: determining that a distance between the first device and the second device becomes greater than the threshold proximity; and causing the first device to become unauthenticated for the access to the first device.

The invention claimed is:

1. A method, comprising:
    determining that a first device is to be authenticated for access to the first device;
    ascertaining whether a second device is within a threshold physical proximity to the first device;
    determining, responsive to ascertaining that the second device is within the threshold physical proximity to the first device, whether the second device is physically authenticated relative to a user of the first device;
    causing the first device to be authenticated for access to the first device based on determining that the second device is physically authenticated relative to the user of the first device;

determining, while the first device is authenticated for access, that a condition occurs indicating one or more of that the second device moves outside of the threshold proximity from the first device, or that the second device is no longer physically authenticated relative to the user; and causing, in response to determining that the condition occurs, the first device to transition from an authenticated state to an unauthenticated state for the access to the first device.

2. The method as recited in claim 1, wherein said determining that the first device is to be authenticated for access to the first device comprises determining that a user is requesting access to one or more of functionality or content that is accessible via the first device.

3. The method as recited in claim 1, wherein the threshold physical proximity comprises a threshold distance between the first device and the second device.

4. The method as recited in claim 1, wherein said ascertaining whether the second device is within a threshold physical proximity to the first device is based on a proximity process performed by the first device to ascertain a physical distance between the first device and the second device.

5. The method as recited in claim 1, wherein said ascertaining whether the second device is within a threshold physical proximity to the first device is based on a proximity process performed by the second device to ascertain a physical distance between the first device and the second device.

6. The method as recited in claim 1, wherein said determining whether the second device is physically authenticated relative to a user of the first device comprises determining whether the second device is in physical contact with the user of the first device.

7. The method as recited in claim 1, wherein said determining whether the second device is physically authenticated relative to a user of the first device comprises determining whether the user of the first device is in possession of the second device.

8. The method as recited in claim 1, wherein said causing the first device to be authenticated for access to the first device is based on the second device being within the threshold proximity to the first device, and the second device being physically authenticated relative to the user of the first device.

9. The method as recited in claim 1, further comprising presenting a notification that indicates a reason why the first device is unauthenticated, and that includes a suggested action for reauthenticating the first device.

10. The method as recited in claim 9, wherein the notification indicates that a physical distance between the second device and the first device is outside of the threshold proximity, and the suggested action suggests that the user move the second device closer to the first device.

11. A system comprising:
a wireless radio system to transmit and receive wireless signal;
a sensor system; and
an authentication module implemented to:
  determine that a first device is to be authenticated for access to the first device;
  ascertain, based on one or more of wireless data received via the wireless radio system, or sensor data obtained via the sensor system, that the first device is within a threshold physical proximity to a second device and that the second device is physically authenticated relative to a user of the first device;
  cause the first device to be authenticated for access to the first device based on ascertaining that the first device is within the threshold proximity and that the second device is physically authenticated relative to the user;
  determine, while the first device is authenticated for access, that a condition occurs indicating one or more of that the second device moves outside of the threshold proximity from the first device, or that the second device is no longer physically authenticated relative to the user; and
  cause, in response to determining that the condition occurs, the first device to transition from an authenticated state to an unauthenticated state for the access to the first device.

12. The system as recited in claim 11, wherein the authentication module is implemented to determine that the first device is to be authenticated for access to the first device based on a request for secure content at the first device.

13. The system as recited in claim 11, wherein the authentication module is implemented to determine that the first device is to be authenticated for access to the first device based on a local authentication at the first device.

14. The system as recited in claim 11, wherein the authentication module is implemented to ascertain that the first device is within the threshold proximity based on one or more of a proximity process performed at the first device, or a proximity process performed at the second device.

15. The system device as recited in claim 11, wherein the authentication module is implemented to ascertain that the second device is physically authenticated relative to the user of the first device based on one or more of detecting physical contact between the user and the second device, or detecting physical possession of the second device by the user.

16. The system as recited in claim 11, wherein the authentication module is further implemented to present a notification that indicates a reason why the first device is unauthenticated and that includes a suggested action for reauthenticating the first device.

17. A method comprising:
determining, based on a local authentication at a first device, that the first device is to be authenticated for access to the first device;
ascertaining that the first device is within a threshold proximity to a second device and that the second device is physically authenticated relative to a user of the first device;
causing the first device to be authenticated for access to the first device based on ascertaining that the first device is within the threshold proximity and that the second device is physically authenticated relative to the user;
determining, while the first device is authenticated for access, that a condition occurs indicating one or more of that the second device moves outside of the threshold proximity from the first device, or that the second device is no longer physically authenticated relative to the user; and
causing the first device to become unauthenticated for the access to the first device.

18. The method as recited in claim 17, wherein said ascertaining that the first device is within the threshold proximity is based on one or more of a determination at the first device of a physical distance between the first device and the second device, or a query from the first device to the second device for a physical distance between the second device and the first device.

19. The method as recited in claim 17, wherein said causing the first device to be authenticated for access to the first device is based on the local authentication at the first device, the first device being within the threshold proximity to the second device, and the second device being physically authenticated relative to the user of the first device.

20. The method as recited in claim 17, further comprising presenting a notification that indicates a reason why the first device is unauthenticated, and that includes a suggested action for reauthenticating the first device.

* * * * *